(12) United States Patent
Asano

(10) Patent No.: US 9,420,263 B2
(45) Date of Patent: Aug. 16, 2016

(54) INFORMATION PROCESSOR AND INFORMATION PROCESSING METHOD

(75) Inventor: Motohiro Asano, Osaka (JP)

(73) Assignee: KONICA MINOLTA, INC., Tokyo (JP)

( * ) Notice: Subject to any disclaimer, the term of this patent is extended or adjusted under 35 U.S.C. 154(b) by 496 days.

(21) Appl. No.: 13/990,614

(22) PCT Filed: Dec. 28, 2010

(86) PCT No.: PCT/JP2010/073751
§ 371 (c)(1),
(2), (4) Date: May 30, 2013

(87) PCT Pub. No.: WO2012/090309
PCT Pub. Date: Jul. 5, 2012

(65) Prior Publication Data
US 2013/0258066 A1 Oct. 3, 2013

(51) Int. Cl.
*H04N 13/02* (2006.01)
*G03B 35/08* (2006.01)
*G03B 35/10* (2006.01)
*H04N 13/04* (2006.01)

(52) U.S. Cl.
CPC ............ *H04N 13/0239* (2013.01); *G03B 35/08* (2013.01); *G03B 35/10* (2013.01); *H04N 13/0271* (2013.01); *H04N 13/0296* (2013.01); *H04N 13/0409* (2013.01)

(58) Field of Classification Search
None
See application file for complete search history.

(56) References Cited

U.S. PATENT DOCUMENTS

2011/0045812 A1* 2/2011 Kim .................. G06F 1/1626
455/418

FOREIGN PATENT DOCUMENTS

| JP | 2009-124308 | 6/2009 |
| JP | 2010-206774 A | 9/2010 |
| JP | 2010-226390 A | 10/2010 |
| WO | WO 2010/090150 A1 | 8/2010 |

OTHER PUBLICATIONS

International Search Report in International Application No. PCT/JP2010/073751 mailed Mar. 22, 2011, 1 page.

* cited by examiner

*Primary Examiner* — Frederick Bailey
(74) *Attorney, Agent, or Firm* — Brinks Gilson & Lione

(57) ABSTRACT

An object of the invention is to provide a technique that can generate an image group of a subject having parallax in a horizontal direction of the actual subject as a stereoscopic image of the subject. In order to attain the object, an information processor includes imaging section having a first imaging system and a second imaging system for imaging a subject from different directions, obtaining section for obtaining determination information for determining a geometrical relationship between an arrangement direction of the first imaging system and the second imaging system and a horizontal direction, determination section for determining the geometrical relationship, and generating section for executing one generating process selected from different first generating process and second generating process according to a determination result of the geometrical relationship based on an imaged result of the imaging section so as to generate a stereoscopic image of the subject.

12 Claims, 24 Drawing Sheets

F I G. 1 7
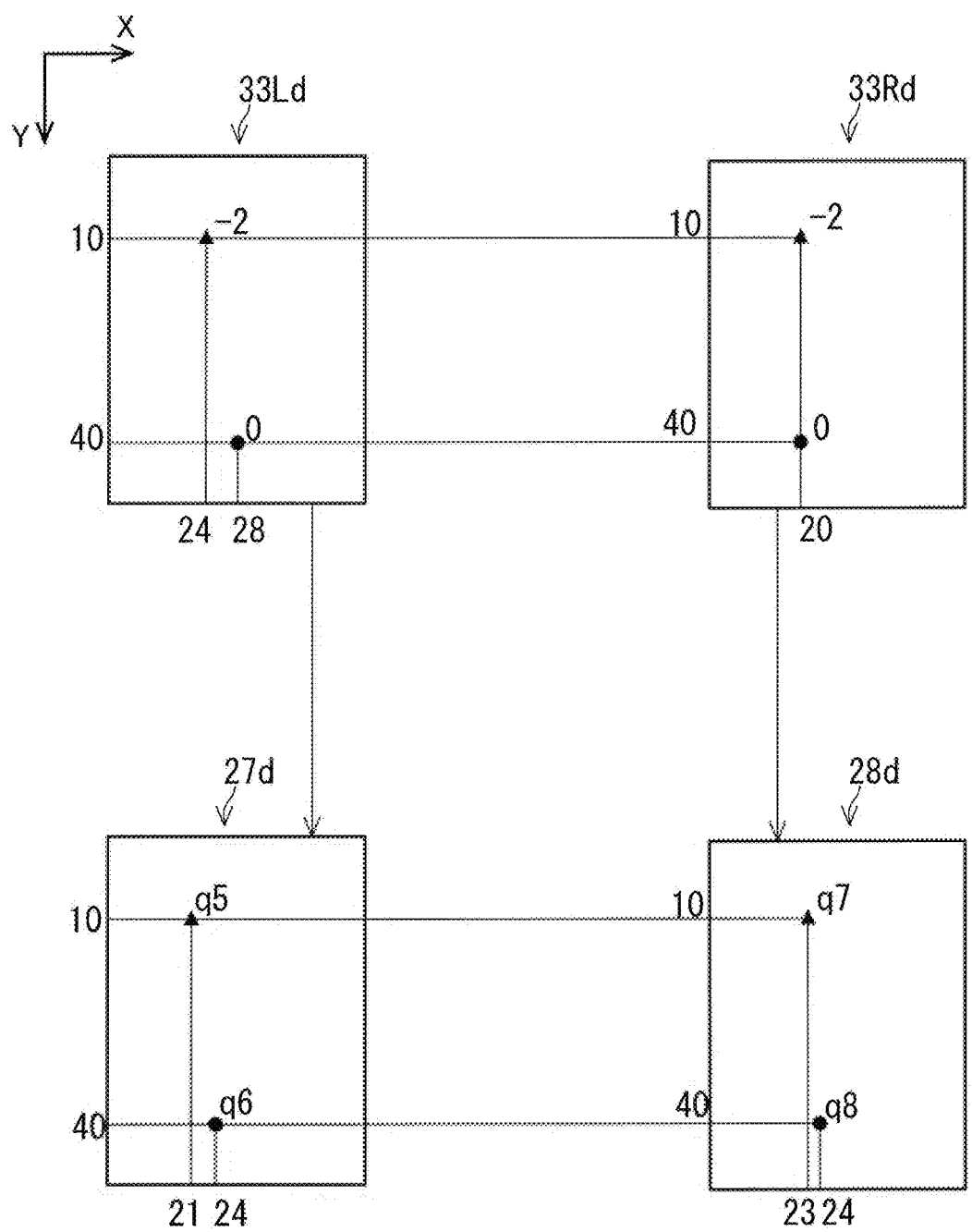

| PIXEL NUMBER OF EACH PIXEL OF PARTIAL IMAGE 58a | 7a | 7b | 7c | 7d | 7e | 7f | 7g | 7h | 7i | 7j |
|---|---|---|---|---|---|---|---|---|---|---|
| X COORDINATE OF EACH PIXEL OF PARTIAL IMAGE 58a | 101 | 102 | 103 | 104 | 105 | 106 | 107 | 108 | 109 | 110 |
| PIXEL SHIFT VALUE | −40 | −40 | −41 | −41 | −41 | −42 | −42 | −41 | −40 | −40 |
| X COORDINATE OF EACH PIXEL OF PARTIAL IMAGE 58b | 61 | 62 | 62 | 63 | 64 | 64 | 65 | 67 | 69 | 70 |
| PIXEL NUMBER OF EACH PIXEL OF PARTIAL IMAGE 58b | 8a | 8b | 8b | 8c | 8d | 8d | 8e | 8g | 8i | 8j |

| LEFT | RIGHT | DIRECTION |
|---|---|---|
| 0001_l.jpg | 0001_r.jpg | 0 (RIGHT/LEFT ARRANGEMENT: 0°) |
| 0002_l.jpg | 0002_r.jpg | 2 (REVERSE ROTATION BY 180°) |
| 0003_l.jpg | 0003_r.jpg | 1 (90° RIGHT) |
| 0004_l.jpg | 0004_r.jpg | 3 (90° LEFT) |
| 0005_l.jpg | 0005_r.jpg | 0 (RIGHT/LEFT ARRANGEMENT: 0°) |

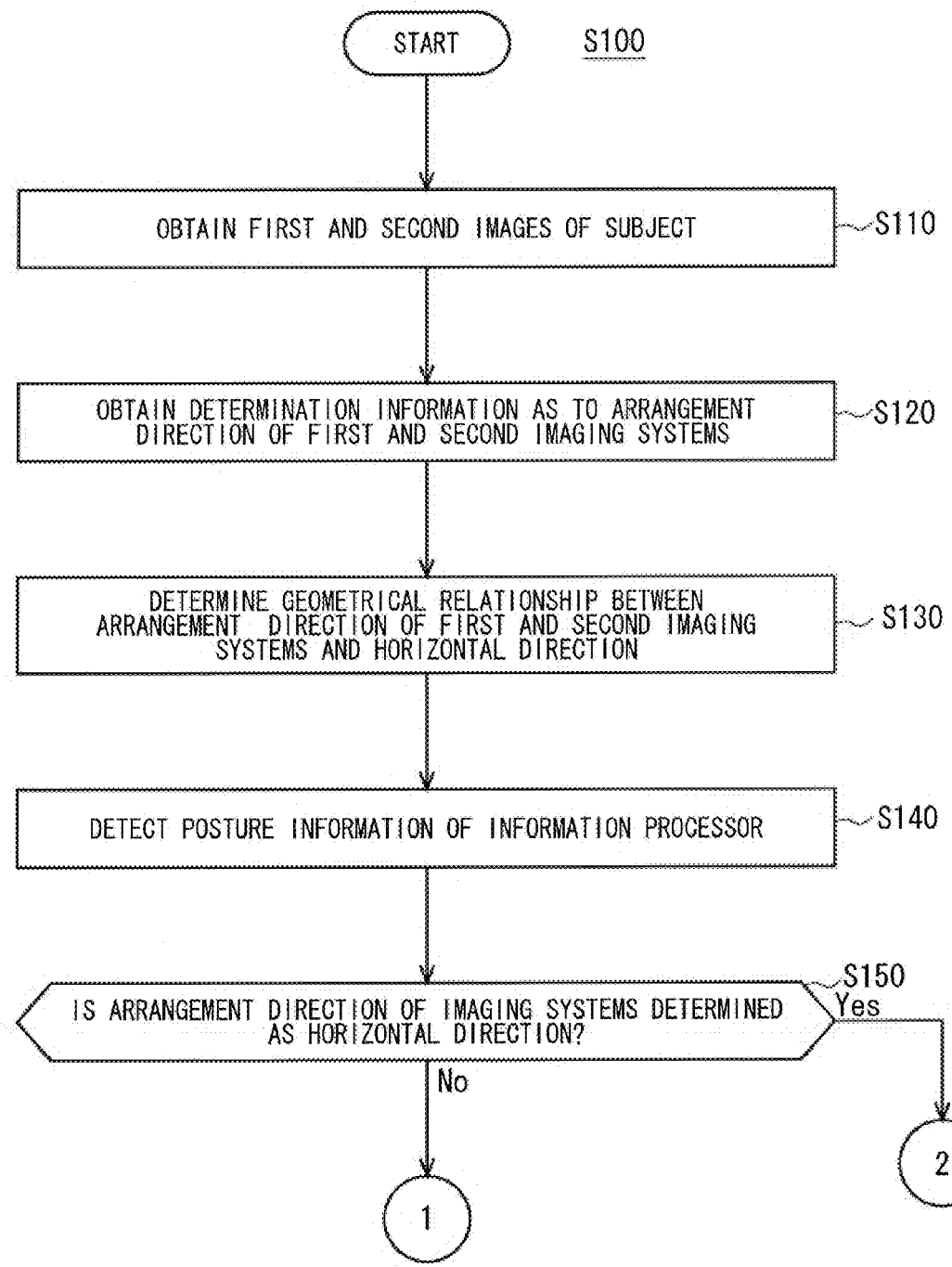

F I G. 3 3
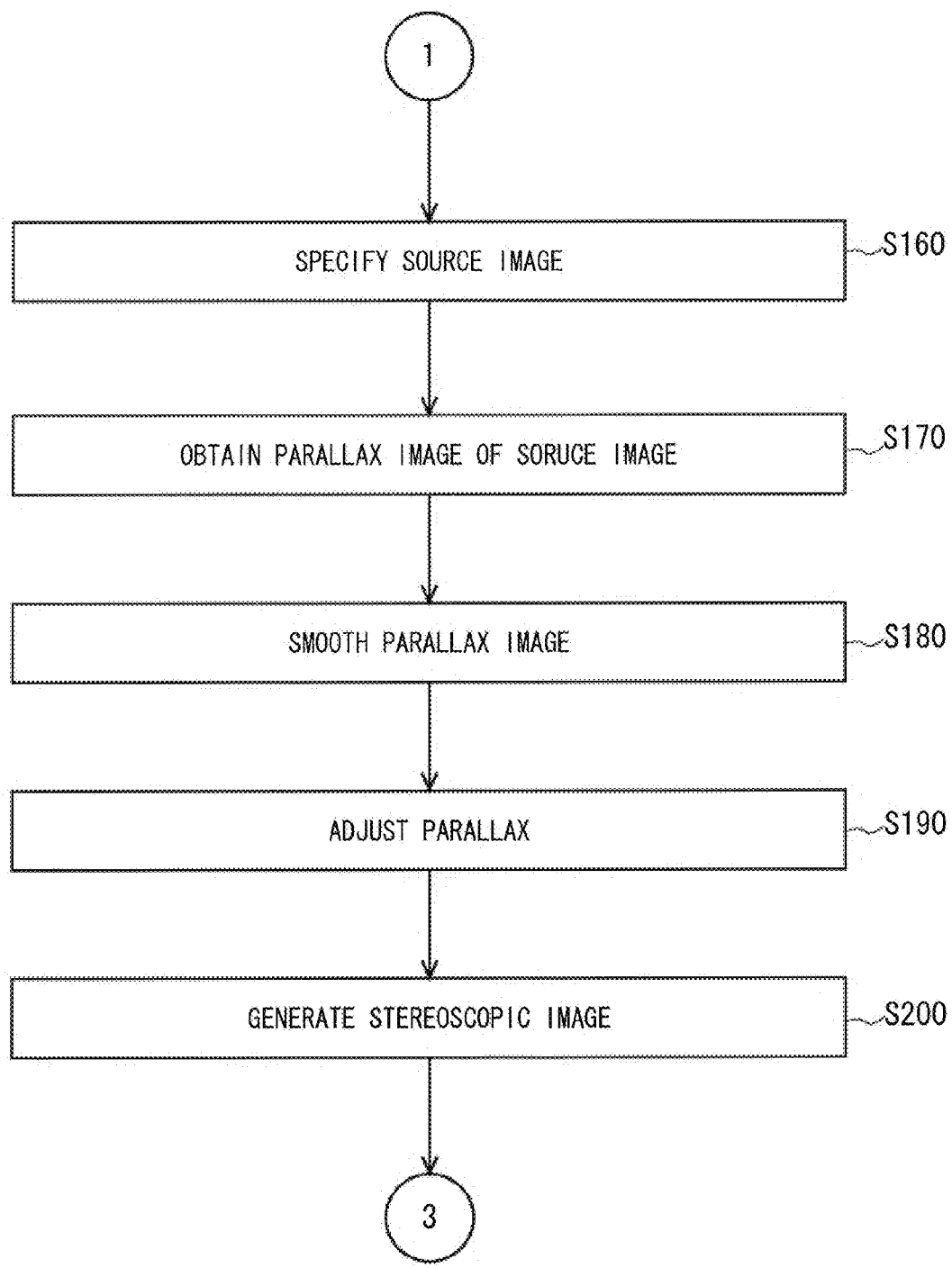

INFORMATION PROCESSOR AND INFORMATION PROCESSING METHOD

This application is the National Stage Application of International Patent Application No. PCT/JP2010/073751, filed Dec. 28, 2010.

TECHNICAL FIELD

The present invention relates to an information processing technique for generating a stereoscopic image.

BACKGROUND ART

In recent years, a three-dimensional display device such as a three-dimensional television on which a displayed image is stereoscopically viewed has been spread, and a technique that can easily generate left-eye and right-eye image groups (stereoscopic images) that can be stereoscopically viewed for a three-dimensional display device is desired. For this reason, devices for generating pseudo images of images obtained when a subject is photographed from a predetermined viewpoint in a simulated manner start to be used for applications for generating stereoscopic images for various three-dimensional display devices.

For example, Patent Document 1 describes a multi-viewpoint image generating system for performing pattern matching on a left image and a right image obtained by photographing a subject through a stereo camera having two right and left cameras so as to search for corresponding pixels of the left image and the right image, and interpolating or extrapolating a distance between the two corresponding pixels so as to generate pseudo images on predetermined positions along an arrangement direction of the left image and the right image.

PRIOR ART DOCUMENT

Patent Document

Patent Document 1: Japanese Patent Application Laid-Open No. 2009-124308

SUMMARY OF THE INVENTION

Problems To Be Solved By the Invention

When a subject is photographed by a stereo camera whose posture is adjusted so that an arrangement direction of right and left cameras is, for example, a vertical direction due to an aspect ratio or the like of an imaging device, a gap in coordinates in image space of the respective images be between the corresponding pixels at the same point of the subject on the respective generated images, namely, parallax is caused in the vertical direction. On the other hand, normally the observer observes the subject with the left and right eyes are arranged in a horizontal direction even in a case where an eye line of an observer of images is up, down or horizontal state. For this reason, even when an image group having parallax in the vertical direction is directly presented as an image group composing a stereoscopic image to the observer, an arrangement direction of observer's both eyes is different from a parallax direction of the image group composing the stereoscopic image, and thus the observer cannot recognize a solid. Further, for example, when a stereoscopic image whose parallax of images is changed into the horizontal direction due to a change in the direction of the display device is presented to the observer, the observer can recognize a solid, but since a direction of the subject is rotate 90° so as to be changed into, for example, a lateral direction, the observer feels a sense of discomfort.

Further, even if the multi-viewpoint image generating system in Patent Document 1 is used for generating a stereoscopic image, when the arrangement direction of the right and left cameras is different from the arrangement direction of the observer's right and left eyes, namely, the horizontal direction, image groups with variously different magnitudes of parallax between left and right images along different directions are generated, but the above problem relating to the stereoscopic view of the observer is not yet solved.

The present invention is devised in order to solve such a problem, and its object is to provide a technique that can generate an image group of a subject having parallax in a horizontal direction in the actual subject as a stereoscopic image even in a case where the arrangement direction of two cameras composing a stereo camera is the horizontal direction or not the horizontal direction.

Means For Solving the Problems

In order to solve the above problem, an information processor from a first aspect includes imaging section having a first imaging system and a second imaging system for photographing a subject from different directions, obtaining section for obtaining determination information for determining a geometrical relationship between an arrangement direction of the first imaging system and the second imaging system and a horizontal direction, determination section for determining the geometrical relationship based on the determination information, and generating section for executing one generating process selected from different first generating process and second generating process according to a determination result of the geometrical relationship based on an imaged result of the imaging section so as to generate a stereoscopic image of the subject.

An information processor from a second aspect depending from the information processor of the first aspect is such that a first source image obtained from the imaged result is target for the first generating process, a second source image obtained from the imaged result is target for the second generating process, and a selection rule is different between the first source image and the second source image from the imaged result.

An information processor from a third aspect depending from the information processor of the second aspect is such that when the arrangement direction is determined as the horizontal direction, the selection rule is such that a first image obtained by the first imaging system and a second image obtained by the second imaging system are adopted as the first source image, and when the arrangement direction is determined as not being the horizontal direction, any one of the first image and the second image is adopted as the second source image.

An information processor from a fourth aspect depending from the information processor of the third aspect is such that the generating section generates a third image obtained by spatially deforming any one of the images in an image space and executes the second generating process on the third image as the second source image.

An information processor from a fifth aspect depending from the information processor of the third aspect is such that the generating section executes the second generating process based on distance information about the imaging section and the subject estimated from any one of the images.

An information processor from a sixth aspect depending from the information processor of the third aspect further includes display section, wherein the generating section executes the second generating process on any one of the first image and the second image displayed on the display section as the second source image.

An information processor from a seventh aspect depending from the information processor of the third aspect further includes detection section for detecting posture information about the information processor at a time when the imaging section obtains the first and second images based on the determination information, and storage section for relating the stereoscopic image with posture information about the information processor detected by the detection section so as to store them.

An information processor from an eighth aspect depending from the information processor of the seventh aspect is such that the detection section specifies the posture information about the information processor from two kinds of postures that are different by 90° around an optical axis of the imaging section.

An information processor from a ninth aspect depending from the information processor of the seventh aspect is such that the detection section specifies the posture information about the information processor from four kinds of postures that are different from each other by every 90° around the optical axis of the imaging section.

An information processor from a tenth aspect depending from the information processor of the third aspect is such that the determination information includes at least one of an operation signal generated by operating the information processor, at least one of the first image and the second image, and an output signal from a posture sensor provided to the information processor.

An information processor from an eleventh aspect depending from the information processor of the third aspect is such that the first generating process and the second generating process use an image that is obtained by spatially shifting pixel values of the first source image and the second source image in pixel unit for generating a stereoscopic image.

An information processor from a twelfth aspect depending from the information processor of the third aspect is such that the generating section generates the stereoscopic image so that a state of parallax in the image group composing the stereoscopic image is different from a state of parallax of the first image and the second image in the first generating process and the second generating process.

An information processor from a thirteenth aspect depending from the information processor of the first aspect is such that the information processor is a mobile information terminal, a digital still camera, or a digital video camera.

An information processing method from a fifteenth aspect includes a determination step of determining a geometrical relationship based on determination information for determining the geometrical relationship between the arrangement direction in the first imaging system and the second imaging system in the imaging section having a first imaging system and a second imaging system for photographing a subject from different directions and a horizontal direction, and a generating step of executing one generating process selected from a first generating process and a second generating process that are different from each other according to a determination result of the geometrical relationship based on imaged result of the imaging section so as to generate a stereoscopic image of the subject.

EFFECTS OF THE INVENTION

The information processor from any of the first to thirteenth aspects or the information processing method from the fifteenth aspect determines the geometrical relationship between the arrangement direction of the first imaging system and the second imaging system and the horizontal direction, and executes one generating process that is selected, according to the determination result of the geometrical relationship, from the first generating process and the second generating process different from each other based on the imaged result of the imaging section so as to generate the stereoscopic image of the subject, and thus can generate the image group of the subject having the parallax in the horizontal direction in the actual subject as the stereoscopic image of the subject even in a case where the arrangement direction of the first imaging system and the second imaging system is the horizontal direction or is different from the horizontal direction.

BRIEF DESCRIPTION OF DRAWINGS

FIG. 17 is a diagram illustrating a concept of one example of a procedure for generating a stereoscopic image.

FIG. 32 is a diagram illustrating an operation flow of the information processor according to the embodiment.

FIG. 33 is a diagram illustrating an operation flow of the information processor according to the embodiment.

EMBODIMENT FOR CARRYING OUT THE INVENTION

<Appearance Constitution of Information Processor 100A:>

Figure 1:
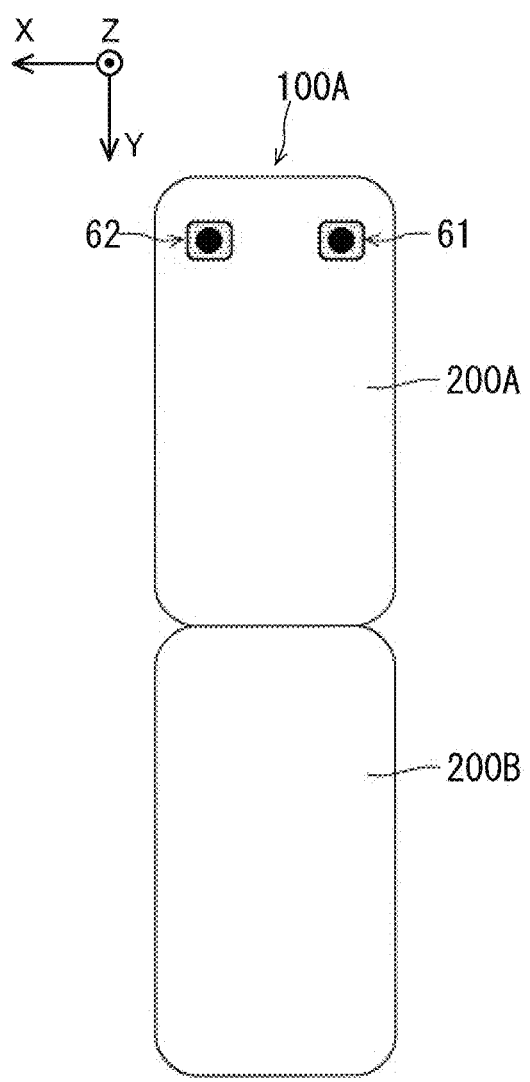
FIG. 1 is a pattern diagram illustrating an appearance outline of an information processor according to an embodiment.
Figure 2:
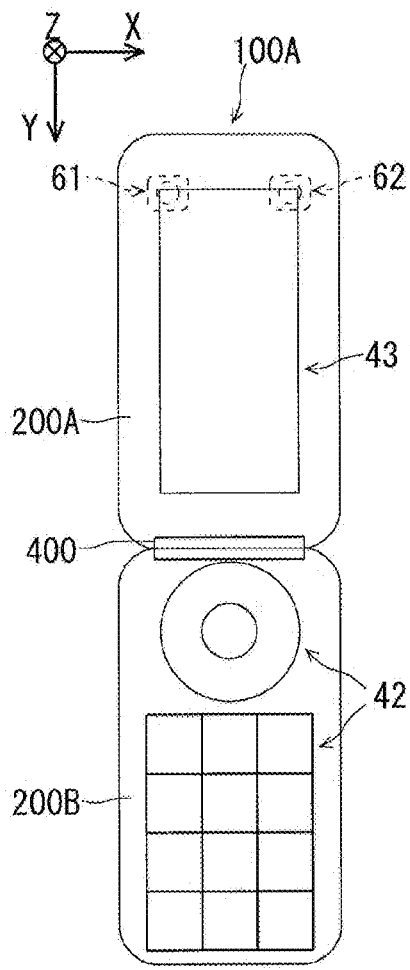
FIG. 2 is a pattern diagram illustrating an appearance outline of the information processor according to the embodiment.
Figure 3:
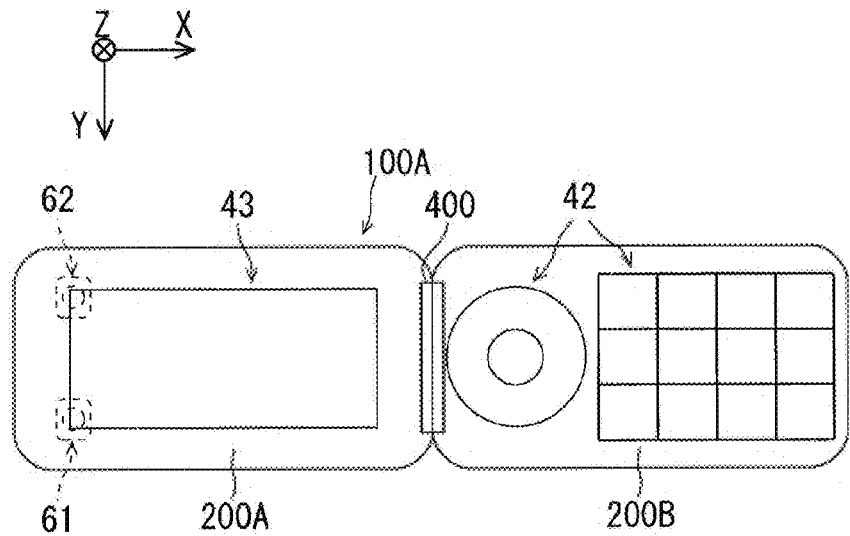
FIG. 3 is a pattern diagram illustrating an appearance outline of the information processor according to the embodiment.

FIG. 1 to FIG. 3 are pattern diagrams illustrating an outline of an appearance constitution of the information processor 100A according to an embodiment of the present invention. In odder to clarify a direction relationship, in FIG. 1 and drawings after FIG. 1, three axes XYZ perpendicular to each other, or two axes XY perpendicular to each other are suitably described.

The information processor 100A is constituted as a folding mobile information terminal that functions as a terminal device for transmitting/receiving various pieces of information to/from a mobile telephone, a camera, and a server device via wireless communication or the like, and as shown in FIG. 1 to FIG. 3, has a housing 200A, a housing 200B, and a hinge section 400. The hinge section 400 connects the housing 200A and the housing 200B with them being mechanically rotatable, and also electrically connects the housing 200A and the housing 200B. The information processor 100A is foldable by the hinge section 400.

FIG. 1 to FIG. 3 illustrate an appearance of the information processor 100A that is opened. FIG. 1 illustrates a surface that is an outer surface of the information processor 100A when the information processor 100A is folded ("rear surface"). Further, FIG. 2 and FIG. 3 illustrate a surface other than the rear surface in a state where the information processor 100A is opened ("front surface").

The housing 200A and the housing 200B are made of plate-type members and have a role of the housing for storing various electronic members. Concretely, the housing 200A has a stereo camera 300 (FIG. 4) provided with a first camera 61 and a second camera 62 on its rear surface, and has a display section 43 on its front surface. Further, the housing 200B has an operation section 42 such as a button on its front surface, and contains a CPU (Central Processing Unit) 11A (FIG. 4) or the like for electrically controlling the information processor 100A.

Further, the information processor 100A generates a stereoscopic image that can be stereoscopically viewed by an operator based on an image of a subject photographed by the stereo camera 300 in various postures shown in FIG. 2 and FIG. 3 so as to display it on the display section 43.

<Constitution and Operation of the Stereo Camera 300:>

Figure 6:
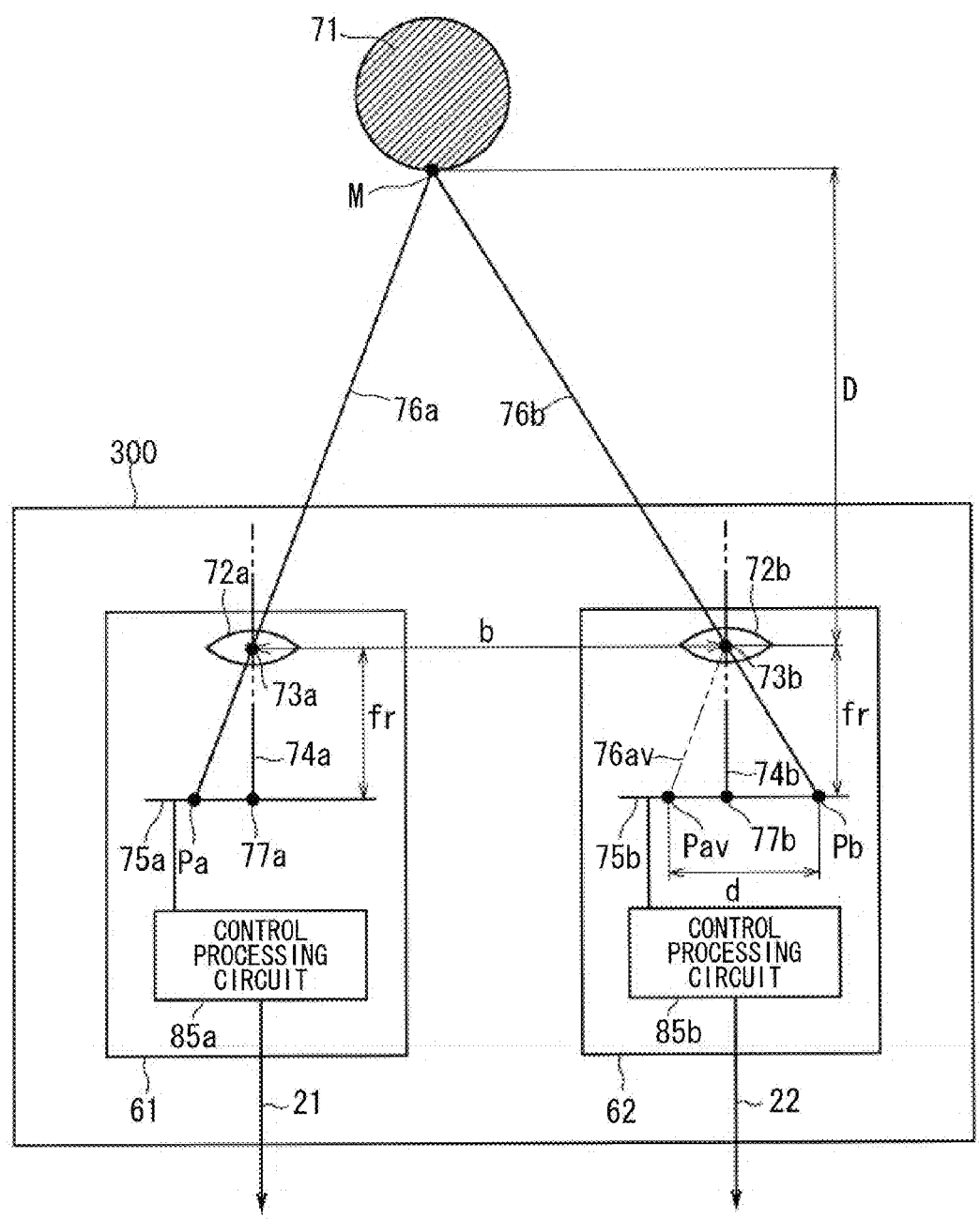
FIG. 6 is a diagram illustrating one example of a main functional constitution of a stereo camera according to the embodiment.

A constitution and an operation of the stereo camera 300 are described below. FIG. 6 is a diagram illustrating one example of a main functional constitution of the stereo camera 300 provided to the information processor 100A according to an embodiment. As shown in FIG. 6, the stereo camera 300 is constituted so as to mainly have the first camera 61 and the second camera 62. Further, the first camera 61 and the second camera 62 are provided so as to be separated across a predetermined base-line length. The first camera 61 is constituted so as to mainly have a photographing optical system 72a, an imaging device 75a, and a control processing circuit 85a. Further, the second camera 62 is constituted so as to mainly have a photographing optical system 72b, an imaging device 75b and a control processing circuit 85b.

Various operations of the stereo camera 300 are controlled based on a control signal 56 (FIG. 5) supplied from a control section 13 of a CPU 11A via an input/output section 41 and a data line DL. The stereo camera 300 obtains a first image 21 and a second image 22 composing a stereo image through photographing of light from a subject 71 using the first camera 61 and the second camera 62. The generated first image 21 and second image 22 are supplied to the input/output section 41 (FIG. 4) via the data line DL.

The photographing optical systems 72a and 72b are constituted so as to mainly have a thin lens and a camera cone, not shown, for supporting this lens, and form an image of the subject 71 on the imaging devices 75a and 75b. At this time, an image of an object point M of the subject 71 is formed as object points Pa and Pb on imaging devices 75a and 75b along principal rays 76a and 76b passing through optical centers 73a and 73b. The optical centers 73a and 73b are normally main points of the imaging optical systems, but for example, when a telecentric optical system is adopted as the imaging optical system, normally a focal point of the imaging optical system is an optical center.

Further, the virtual principal ray 76av is a virtual principal ray obtained when the principal ray 76a moves in a parallel fashion so as to pass through the optical center 73b, and a virtual object point Pav corresponding to the object point Pa is set on the imaging device 75b along the virtual principal ray 76av.

Imaging centers 77a and 77b of the first camera 61 and the second camera 62 are an intersection between the imaging device 75a and an optical axis 74a and an intersection between the imaging device 75b and an optical axis 74b, and a base line length b between the photographing optical systems 72a and 72b is a distance between the optical centers 73a and 73b.

A distance d between the virtual image point Pav and image point Pb is a distance between image point positions at a time when the image points Pa and Pb corresponding to the same object point M on the subject 71 are expressed by a common image coordinate system whose coordinates of imaging centers are equal to each other, and corresponds to parallax of the first camera 61 and the second camera 62 with respect to the object point M.

As to the stereo camera 300, focal lengths fr of the photographing optical systems 72a and 72b (more definitely, a distance between the optical center and the imaging device) are equal to each other, and the optical axes 74a and 74b are parallel with each other. Further, main planes of the photographing optical systems 72a and 72b are on the same plane vertical to the optical axes 74a and 74b, and the optical centers 73a and 73b are also on the same plane. Further, the imaging devices 75a and 75b of the photographing optical systems are on the same plane vertical to the optical axes 74a and 74b, respectively. Further, in order to easily execute corresponding point searching process between the first image 21 and the second image 22, the imaging devices 75a and 75b are provided so that their scanning lines are parallel.

In the actual constitution, normally the above-described constitutional conditions have a margin of error, but the CPU 11A executes a process using camera parameters ("parallelizing process") on the first image 21 and the second image 22 supplied from the first camera 61 and the second camera 62, respectively, so as to realize a state equivalent to the case where the respective function elements of the stereo camera 300 satisfy the above-described constitutional conditions.

When the parallelizing process is executed, a distance D between the main planes of the photographing optical systems 72a and 72b and the object point M is obtained according to a formula (1) using the parallax d, the focal length fr, and the base line length b between the photographing optical systems 72a and 72b.

[Mathematical Formula 1]

$$D=(fr \times b)/d \quad (1)$$

As expressed by the formula (1), the parallax is an index value of a distance from the stereo camera 300 to the point on the subject.

The imaging devices 75a and 75b are imaging device including, for example, a CCD image sensor or a CMOS image sensor having effective pixels of 3456×2592 pixels, and generate image signals according to strengths of images formed on the imaging devices 75a and 75b so as to supply them to the control processing circuit 85a and the control processing circuit 85b. The imaging devices 75a and 75b do not deteriorate usability of the present invention even in a case of a color image sensor or a case of a monochrome image sensor. Further, the imaging devices 75a and 75b do not deteriorate the usability of the present invention even in a case where any one of a number of pixels in a main scanning direction (horizontal scanning direction) and a number of pixels in a vice-scanning direction (vertical scanning direction) is larger than the other one or both of them are equal to each other.

The control processing circuit 85a and the control processing circuit 85b shown in FIG. 6 synchronize the respective image signals supplied from the imaging devices 75a and 75b with each other and convert them into digital images, so as to generate the first image 21 and the second image 22 according to the effective pixels of the respective imaging devices. The generated first image 21 and second image 22 compose a stereoscopic image of the subject.

When positional relationships of the subject with respect to the stereo camera 300 at times of capturing the first image 21 and the second image 22 are the same as each other, the first image 21 and the second image 22 do not have to be captured at the same time. Further, the stereo camera 300 photographs the subject successively in a time sequence with the first camera 61 being synchronized with the second camera 62, so as to be capable of generating a plurality of the first images 21 and a plurality of the second images 22 ("time-series stereo image").

<Constitution of the Information Processor 100A:>

Figure 4:
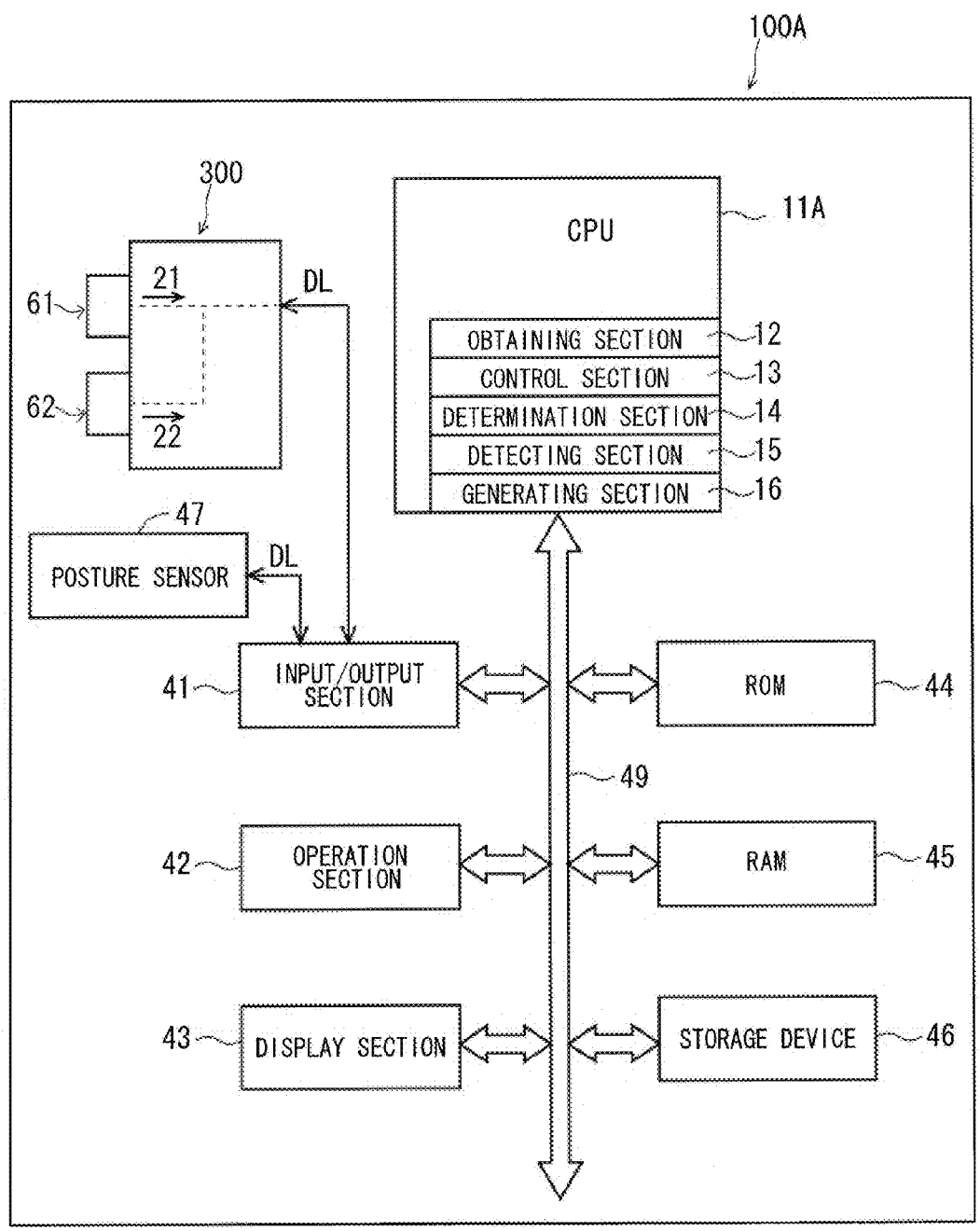
FIG. 4 is a diagram illustrating one example of a main constitution of the information processor according to the embodiment.

FIG. 4 is a block diagram illustrating one example of a main constitution of the information processor 100A according to the embodiment. As shown in FIG. 4, the information processor 100A is constituted so as to mainly have the CPU 11A, the input/output section 41, the operation section 42, the display section 43, a ROM 44, a RAM 45, a storage device 46, a posture sensor 47 and the above-described stereo camera 300.

The input/output section 41 includes, for example, a connector or the like for electrically connecting the data line DL electrically connected to the stereo camera 300 and the posture sensor 47 with a signal line 49, and for transmitting/receiving data with the stereo camera 300 and the CPU 11A. Concretely, the input/output section 41 supplies, for example, various control signals with which the CPU 11A controls the stereo camera 300 to the stereo camera 300 connected to the input/output section 41 via the data line DL. Further, the input/output section 41 supplies the first image 21 and the second image 22 captured by the stereo camera 300 to the RAM 45 and the CPU 11A, and supplies an output signal 51 output from the posture sensor 47 to the CPU 11A. The input/output section 41 further has an interface such as a USB interface for external devices. For this reason, the information processor 100A can obtain, via the input/output section 41, the first image 21 and the second image 22 that are captured and stored in an external device such as a computer in advance.

The operation section 42 includes, for example, various operation buttons provided on the front surface of the housing 200B, and an operator operates the operation section 42 so that an operation signal 52 corresponding to the operation is supplied from the operation section 42 to the CPU 11A. The CPU 11A sets various control parameters and various operation modes of the information processor 100A based on the supplied operation signal 52. Further, the respective function sections of the information processor 100A execute processes according to the operation modes set via the operation section 42. The operation section 42 is provided with buttons or switches with which the operator inputs postures of the information processor 100A at time of photographing the subject into the information processor 100A. The postures include, for example, a posture of the information processor 100A in which the arrangement direction of the first camera 61 and the second camera 62 is a horizontal direction (X-axial direction) as shown in FIG. 2, or a posture of the information processor 100A in which the arrangement direction is a vertical direction (Y-axial direction) as shown in FIG. 3. In this case, the operation signal 52 is a signal corresponding to a switch setting state set by the operation in order to set the result of the posture input by the operator or information about the posture to the information processor 100A. Further, even when the operation section 42 is provided with a photographing button of the stereo camera 300 in positions where the operator easily performs the operation according to the postures of the information processor 100A and the operation signal 52 representing that any of the photographing buttons is operated is supplied to the CPU 11A, the usability of the present invention is not deteriorated.

The display section 43 includes a liquid crystal display for three-dimensional display that adopts a parallax barrier system where a spatial distribution direction of respective barrier sections in the display section 43 can be switched in a plurality of directions such as X-axial direction and a Y-axial direction in FIG. 2 according to control of the CPU 11A. The CPU 11A switches the barrier direction of the display section 43 according to a parallax direction of the right-eye image and the left-eye image to be displayed on the display section 43, so as to be capable of switching a direction where an observer who observes a stereoscopic image displayed on the display section 43 can visually recognize a solid shape with the naked eyes. Further, for example, even when a three-dimensional display system, in which the display section 43 displays a left-eye image and a right-eye image alternately at a high speed in a switching manner and in synchronization with the switching, and the stereoscopic image displayed on the display section 43 is observed via a pair of special eyeglasses whose shutter sections for a left eye and a right eye respectively can be alternately opened and closed, is adopted, the usability of the present invention is not deteriorated. In the three-dimensional display system, the CPU 11A switches the parallax direction of a left-eye image and a right-eye image displayed on the display section 43 so that the observer who wears a pair of special eyeglasses observes a stereoscopic image so as to be capable of switching the direction where a solid can be recognized. The display section 43 can display the first image 21 and the second image 22 supplied from the stereo camera 300, and various pieces of setting information about the information processor 100A so that they can be visually recognized by the observer as a two-dimensional image and character information.

The ROM (Read Only Memory) 44 is a read only memory and stores a program or the like for operating the CPU 11A. A read/write nonvolatile memory (for example, flash memory) may be used instead of the ROM 44.

The RAM (Random Access Memory) 45 is a read/write volatile memory. The RAM 45 functions as an image storage section for temporarily storing various images captured by the stereo camera 300, stereoscopic images generated by the information processor 100A, and parallax information (parallax image). Further, the RAM 45 functions as a work memory for temporarily storing processing information about the CPU 11A.

The storage device 46 includes, for example, a read/write nonvolatile memory such as a flash memory or a small hard disc device, and permanently stores the various control parameters of the information processor 100A and information about the various operation modes. Further, the storage device 46 permanently stores stereoscopic images generated by the information processor 100A and posture information about the information processor 100A detected based on the output signal 51 (FIG. 5) from the posture sensor 47 with them being related with each other.

The posture sensor 47 includes a small posture sensor that is mounted with, for example, a triaxial gyro sensor and a triaxial acceleration sensor using an MEMS (Micro Electro Mechanical Systems) technique or the like. The posture sensor 47 is electrically connected with the input/output section 41 by the data line DL, and successively supplies the output signal 51 (FIG. 5) according to the postures of the information processor 100A with respect to the vertical direction (a direction of gravitational force) to the input/output section 41. Further, the CPU 11A obtains the output signal 51 supplied from the input/output section 41 at predetermined timing.

The CPU (Central Processing Unit) 11A is a control processing device for controlling the respective function sections of the information processor 100A in an integrated manner, and making control and executing a process according to a program stored in the ROM 44. The CPU 11A functions, as described later, also as an obtaining section 12, the control section 13, a determining section 14, a detecting section 15, and a generating section 16.

The CPU 11A generates a left-eye image 27 and a right-eye image 28 composing the stereoscopic image of the subject through these function sections based on the images of the subject photographed by the stereo camera 300. Further, the CPU 11A controls the imaging operation of the stereo camera 300, and controls the display section 43 so as to display various images, stereoscopic images, calculated results, and various pieces of control information on the display section 43.

Further, the CPU 11A, the input/output section 41, the operation section 42, the display section 43, the ROM 44, the RAM 45, the storage device 46, and the posture sensor 47 are electrically connected via the signal line 49. Therefore, the CPU 11A, for example, can control the stereo camera 300 via the input/output section 41, obtain image information from the stereo camera 300, obtain the output signal 51 from the posture sensor 47, and display on the display section 43 at predetermined timing.

In the constitutional example shown in FIG. 1, the respective function sections of the obtaining section 12, the control section 13, the determining section 14, the detecting section 15, and the generating section 16 are realized by executing a predetermined program by the CPU 11A, but these function sections may be realized by, for example, special hardware circuits, respectively.

<Operation of the Respective Function Sections of the Information Processor 100A:>

Figure 5:
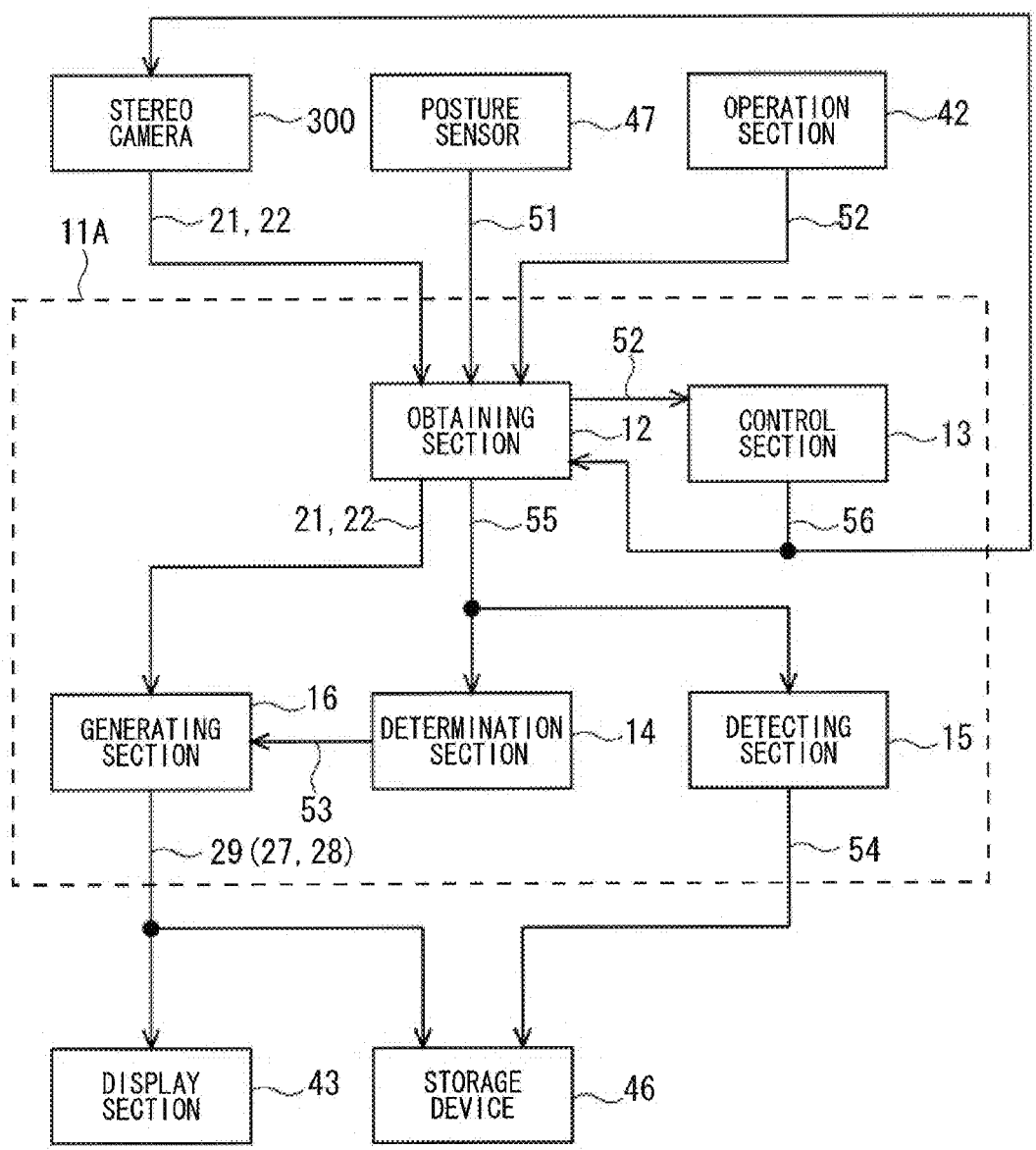
FIG. 5 is a diagram illustrating one example of a functional constitution of the information processor according to the embodiment.

FIG. 5 is a block diagram illustrating one example of a main functional constitution of the information processor 100A according to the embodiment. As shown in FIG. 5, the information processor 100A generates a stereoscopic image 29 of a subject, namely, the left-eye image 27 and the right-eye image 28 based on at least one of the first image 21 obtained based on photographing of the subject through the first camera 61 (FIG. 1) of the stereo camera 300 and the second image 22 obtained based on photographing of the subject through the second camera 62 (FIG. 1).

Figure 34:
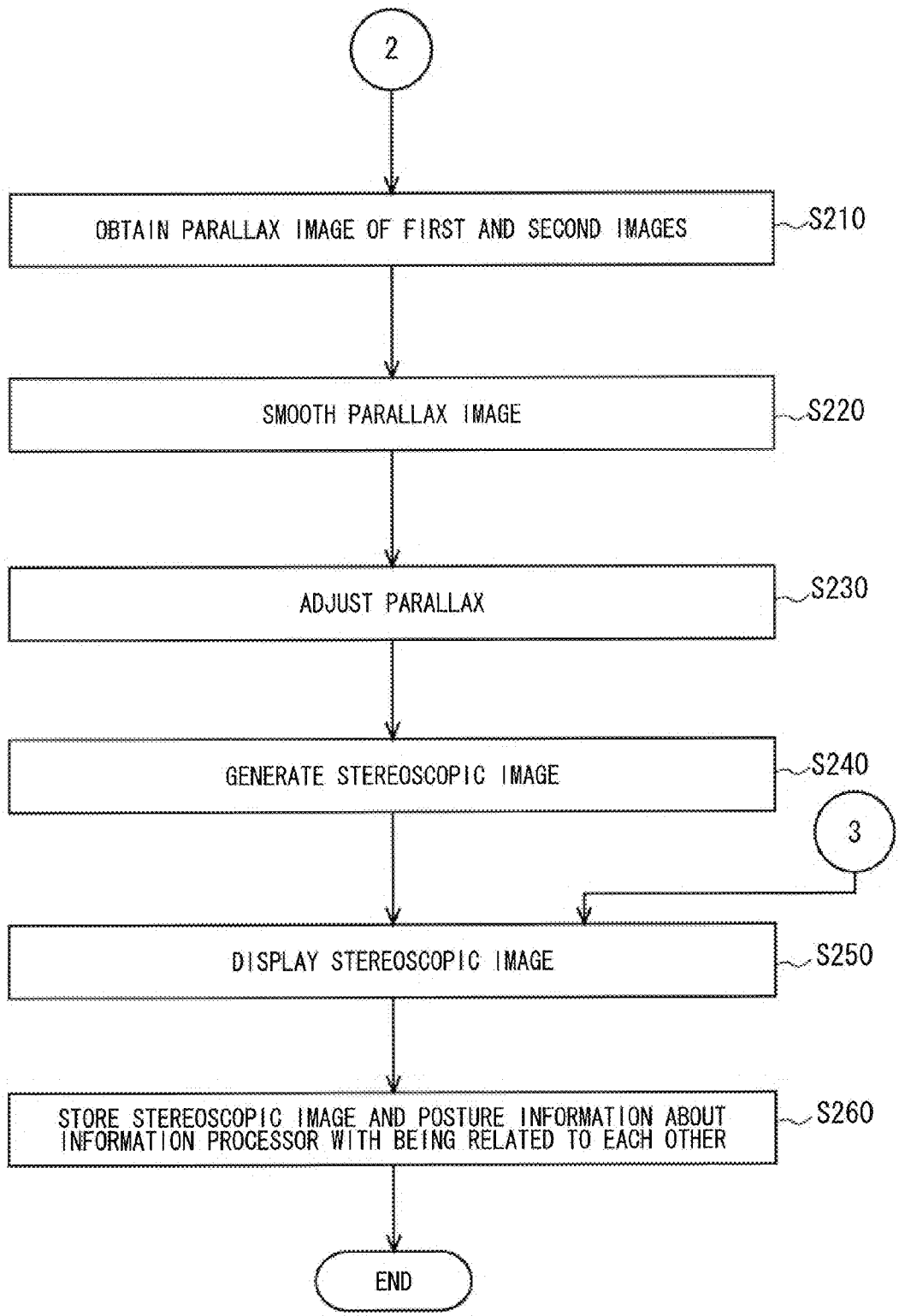
FIG. 34 is a diagram illustrating an operation flow of the information processor according to the embodiment.

FIG. 32 to FIG. 34 are diagrams illustrating an operation flow S100 at which the information processor 100A generates a stereoscopic image 29 according to the embodiment. Operations of the respective function sections of the information processor 100A are described below with reference to FIG. 5 and FIGS. 32 to 34.

Prior to a process for generating the stereoscopic image 29 of a subject executed by the information processor 100A, the position and the posture of the information processor 100A are adjusted by the operator so that both the first camera 61 and the second camera 62 provided to the stereo camera 300 can photograph the subject.

Operations of the Stereo Camera 300 and the Control Section 13:

When the photographing button provided to the operation section 42 is operated with the position and the posture of the information processor 100A being adjusted, as shown in FIG. 5, the operation signal for instructing start of the photographing operation by the stereo camera 300 is supplied as the operation signal 52 to the control section 13 via the obtaining section 12. The control section 13 supplies the control signal 56 (FIG. 5) for making the stereo camera 300 perform the photographing operation to the stereo camera 300 and the obtaining section 12.

When the control signal 56 is supplied, the stereo camera 300 starts the photographing operation for photographing a subject through the first camera 61 and the second camera 62 from different directions. When the photographing operation is ended, the first image 21 and the second image 22 composing the stereo image of the subject photographed by the first camera 61 and the second camera 62 of the stereo camera 300 are generated.

Operation of the Obtaining Section 12:

The generated first image 21 and second image 22 of the subject are supplied to the obtaining section 12 via the input/output section 41 (FIG. 4), and are obtained by the obtaining section 12 (step S110 in FIG. 32). When the first image 21 and the second image 22 are obtained, the obtaining section 12 obtains determination information 55 (FIG. 5) with which the determining section 14 determines the geometrical relationship between the arrangement direction of the first camera 61 and the second camera 62 and the horizontal direction (step S120). The arrangement direction between the first camera 61 and the second camera 62 is, concretely, for example, a direction of the base line of the stereo camera 300 that connects the optical center 73a (FIG. 6) and the optical center 73b (FIG. 6).

Further, the obtaining section 12, concretely, for example, obtains at least one of the operation signal 52 generated by operating the operation section 42, at least one of the first image 21 and the second image 22, and the output signal 51 from the posture sensor 47. The obtained determination information 55 is supplied to the determining section 14 and the detecting section 15.

Operation of the Determining Section 14;

The determining section 14 determines whether the arrangement direction of the first camera 61 and the second camera 62 is, for example, the horizontal direction, or the vertical direction vertical to the horizontal direction, or a direction oblique to the horizontal direction based on the supplied determination information 55. That is to say, the determining section 14 determines the geometrical relationship between the arrangement direction of the first camera 61 and the second camera 62 and the horizontal direction based on the determination information 55 (step S130 at FIG. 32). As the determining process, the determining section 14 executes, for example, at least one of a process for determining the geometrical relationship based on a signal expressing the posture of the information processor 100A at the time of photographing in the operation signals 52, a process for determining the geometrical relationship based on the output signal 51, and a process for carrying out OCR (optical character recognition) on at least one of the first image 21 and the second image 22 and determining a direction of characters in an image so as to determine the geometrical relationship. Further, as the process on the first image 21 and the second image 22, for example, a process for determining the geometrical relationship based on a characteristic portion such as an arrangement direction of person's both eyes extracted by executing a person recognizing process on an image may be adopted. Further, a determination result of the geometrical relationship determined by the determining section 14 is supplied as the determination result information 53 to the generating section 16.

Operation of the Detecting Section 15:

The detecting section 15 detects posture information 54 (FIG. 5) about the information processor 100A at a time when an image of a subject used by the generating section 16 for generating the stereoscopic image 29 is photographed by the stereo camera 300 based on the determination information 55 (step S140). The detected posture information 54 is related with the stereoscopic image 29 so as to be temporarily stored in the RAM 45, and is permanently stored in the storage device 46 in response to a predetermined operation signal from the operation section 42. Further, the detecting section 15 obtains, for example, the determination information 55 that is supplied to the obtaining section 12 in cases other than the photographing through the stereo camera 300 such as a case where the stereoscopic image stored in the storage device 46 is displayed on the display section 43, and detects the posture information 54 (FIG. 5) about the information processor 100A.

Operation of the Generating Section 16:

When the posture information 54 is detected, the generating section 16 checks whether the arrangement direction of the first camera 61 and the second camera 62 is determined as the horizontal direction based on the determination result information 53 supplied from the determining section 14 (step S150 in FIG. 32).

As a result of checking in step S150, when the determination is made that the arrangement direction of the first camera 61 and the second camera 62 is other than the horizontal direction, the generating section 16 executes a generating process A for generating the stereoscopic image 29. Further, as the result of checking in step S150, when the determination is made that the arrangement direction of the first camera 61 and the second camera 62 is the horizontal direction, the generating section 16 executes a generating process B for generating the stereoscopic image 29. The generating processes A and B are different from each other, and are executed based on imaged results of the subject through the information processor 100A. That is to say, the generating section 16 selectively executes the different generating process A and generating process B according to the determination result of the geometrical relationship between the arrangement direction of the first camera 61 and the second camera 62 and the horizontal direction, so as to generate the stereoscopic image 29 of the subject.

Switching between the generating process A and the generating process B through the generating section 16 is described below, and the generating process A and the generating process B are also described.

Switching Between the Generating Process A and the Generating Process B:

The switching between the generating process A and the generating process B is described by illustrating a case where the posture of the information processor 100A is set to the posture shown in FIG. 2 and the posture shown in FIG. 3 and the stereoscopic image 29 is generated. In FIG. 2, the arrangement direction of the first camera 61 and the second camera 62 is the horizontal direction (X-axial direction), and in FIG. 3, the arrangement direction is the vertical direction (Y-axial direction).

When the posture of the information processor 100A is the posture shown in FIG. 2, the first image 21 of the subject captured by the first camera 61 on the left side (−X direction side) is a left image 25. Further, the second image 22 of the subject captured by the second camera 62 (+X direction side) is a right image 26. When the posture of the information processor 100A is the posture shown in FIG. 3, the second image 22 of the subject captured by the second camera 62 on the upper side (−Y direction side) is an upper image 23. Further, the first image 21 of the subject captured by the first camera 61 on the lower side (+Y direction side) is a lower image 24.

Figure 7:
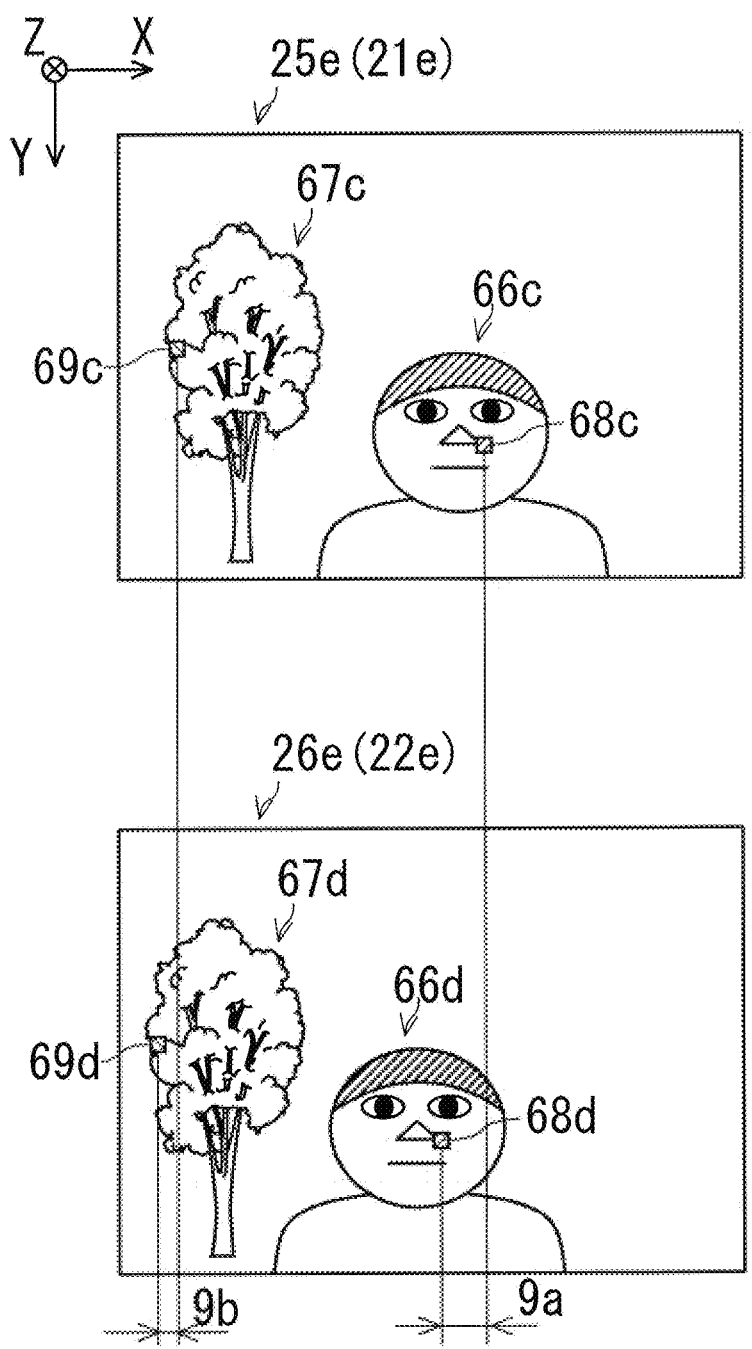
FIG. 7 is a diagram illustrating one example of parallax of a left image and a right image.
Figure 8:
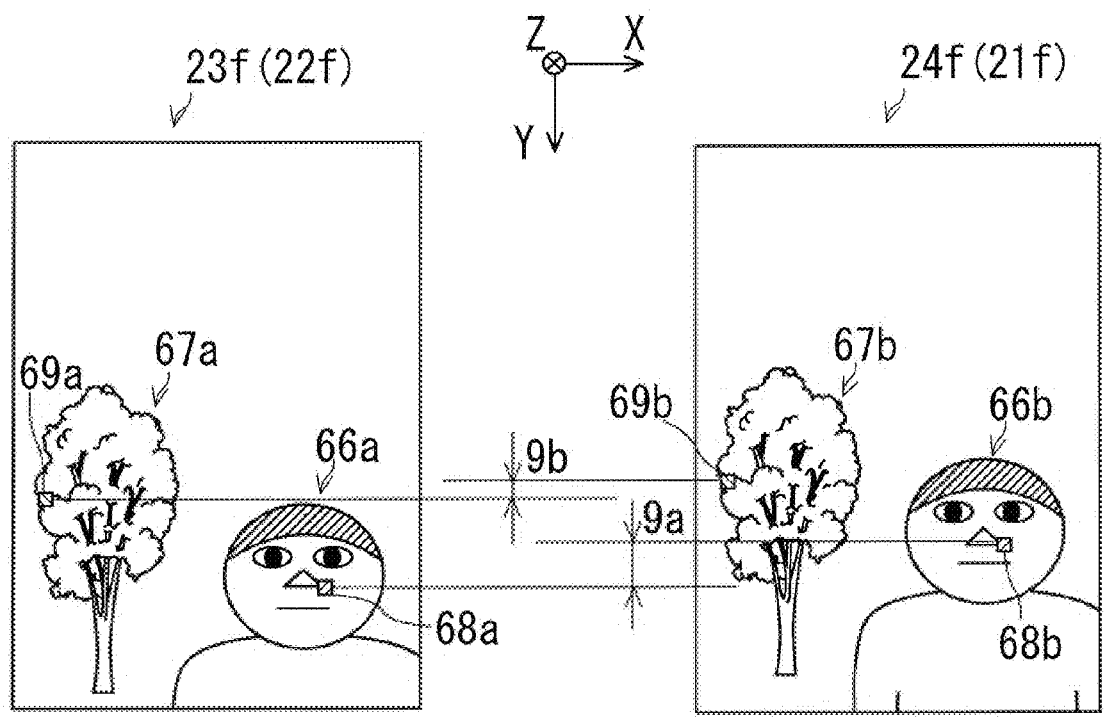
FIG. 8 is a diagram illustrating one example of parallax of an upper image and a lower image.

Further, FIG. 7 is a diagram illustrating one example of parallax of a left image 25e (first image 21e) and a right image 26e (second image 22e) in the case where the posture of the information processor 100A is the posture shown in FIG. 2. FIG. 8 is a diagram illustrating one example of parallax between an upper image 23f (second image 220 and a lower image 24f (first image 210 in the case where the posture of the information processor 100A is the posture shown in FIG. 3. The first image 21e and the first image 21f are examples of the first image 21, and the second image 22e and the second image 22f are examples of the second image 22. Further, the upper image 23f, the lower image 24f, the left image 25e, and the right image 26e are examples of the upper image 23, the lower image 24, the left image 25, and the right image 26, respectively.

In FIG. 7, as to the left image 25e and the right image 26e, closeup subject images 66c and 66d of a near-side subject on the positioned in the +Z direction with respect to the stereo camera 300 are captured, and long-distance subject images 67c and 67d of the same far-side subject on the side farther than the near-side subject in the +Z direction with respect to the stereo camera 300 are captured. In FIG. 7, in order to ease the description, only edges (outlines) of respective characteristic portions on the subject images are displayed. Further, a pixel 68c on the closeup subject image 66c and a pixel 68d on the closeup subject image 66d are pixels corresponding to the same points of the near-side subject, and a pixel 69c on the long-distance subject image 67c and a pixel 69d on the long-distance subject image 67d are pixels corresponding to the same points on the far-side subject. Further, parallax 9c is parallax of the pixel 68c and the pixel 68d, and parallax 9d is parallax of the pixel 69c and the pixel 69d. In FIG. 7, the left image 25e and the right image 26e are arranged in the vertical direction (Y-axial direction in FIG. 7) to be displayed so that X coordinates on left ends (right ends) of both the images are equal to each other in order to easily understand the parallax.

As shown in FIG. 7, the parallax 9c and the parallax 9d are caused in the horizontal direction (X-axial direction). Further, the parallax 9c and the parallax 9d have different values due to a difference in the distances from the stereo camera 300 to the near-side subject and the far-side subject. More specifically, the parallax 9c related to the near-side subject is larger than the parallax 9d related to the far-side subject. The magnitudes of the parallax fluctuate according to the distance from the stereo camera 300 to a point on the subject corresponding to a pixel on the image.

In FIG. 8, as to the upper image 23f and the lower image 24f, closeup subject images 66a and 66b of the same near-side subject positioned in the +Z direction with respect to the stereo camera 300 are captured, and long-distance subject images 67a and 67b of the same far-side subject in the +Z direction with respect to the stereo camera 300 farther than the near-side subject are captured. Further, a pixel 68a on the closeup subject image 66a and a pixel 68b on the closeup subject image 66b are pixels corresponding to the same point on the near-side subject, and a pixel 69a on the long-distance subject image 67a and a pixel 69b on the long-distance subject image 67b are pixels corresponding to the same points on the far-side subject. Further, parallax 9a is parallax of the pixel 68a and the pixel 68b, and parallax 9b is parallax of the pixel 69a and the pixel 69b. In FIG. 8, similarly to FIG. 7, only edges (outlines) of respective characteristic portions on the subject images are displayed. Further, the upper image 23f and the lower image 24f are arranged in the horizontal direction (the X-axial direction in FIG. 8) to be displayed so that Y coordinates of upper ends (lower ends) of both images are equal to each other in order to easily understand the parallax. The parallax 9a and the parallax 9b are caused in the vertical direction (Y-axial direction), and the parallax 9a related to the near-side subject is larger than the parallax 9b related to the far-side subject.

As shown in FIG. 7 and FIG. 8, when the posture of the information processor 100A is the posture shown in FIG. 2, namely, the arrangement direction of the first camera 61 and the second camera 62 is the horizontal direction (X-axial direction), the parallax of the left image 25e and the right image 26e is caused in the horizontal direction (X-axial direction, right-left direction). On the other hand, when the posture of the information processor 100A is the posture shown in FIG. 3, namely, the arrangement direction of the first camera 61 and the second camera 62 is the vertical direction (Y-axial direction), the parallax of the upper image 23f and the lower image 24f is caused in the vertical direction (Y-axial direction, up-down direction).

Therefore, when the arrangement direction of a left eye and a right eye of the observer who observes the display section 43 of the information processor 100A shown in FIG. 2 is the horizontal direction (X-axial direction), for example, and the left image 25e and the right image 26e are displayed as the left-eye image 27 and the right-eye image 28 on the display section 43 so that the direction of the left image 25e and the right image 26e with respect to the coordinate system shown in FIG. 7 is maintained also on the coordinate system shown in FIG. 2, the arrangement direction of both the observer's eyes matches with the direction of the parallax between the images, and thus the observer can recognize a solid. When the display section 43 is, for example, a display of a parallax barrier system, a longitudinal direction of respective barriers in the display section 43 is set so as to be along the Y-axial direction (the vertical direction). Further, the setting of the display section 43 is carried out, for example, in a manner that the CPU 11A controls the display section 43 based on the posture information 54 about the information processor 100A obtained by the detecting section 15.

However, when the posture of the information processor 100A is the posture shown in FIG. 3, and the upper image 23f and the lower image 24f are displayed as the left-eye image 27 and the right-eye image 28 on the display section 43 so that the direction of the upper image 23f and the lower image 24f with respect to the coordinate system shown in FIG. 8 is maintained with respect to the coordinate system shown in FIG. 3, the observer cannot recognize a solid because the arrangement direction of the observer's both eyes is different from the direction of the parallax between the upper image 23f and the lower image 24f. The arrangement direction of the right and left eyes of the observer who observes the display section 43 in FIG. 3 is the horizontal direction (X-axial direction). Further, for example, a direction of the lengthwise direction of the display section 43 that is the respective barriers of a parallax barrier type display is rotated relatively 90° about the Z axis with respect to the information processor 100A from the lengthwise direction of the barriers in FIG. 2, and the lengthwise direction is set so as to be along the Y-axial direction (the vertical direction) in FIG. 3.

In this case, when the direction of the upper image 23f and the lower image 24f displayed on the display section 43 in FIG. 3 is rotated 90° about, for example, the Z axis on the coordinate system shown in FIG. 3, the observer can recognize a solid because the arrangement direction of the observer's both eyes matches with the direction of the parallax between the upper image 23f and the lower image 24f displayed on the display section 43. However, since the direction of the subject displayed on the display section 43 is different from the direction of the actual subject, the observer feels a sense of discomfort.

As described above, even when the left image 25e and the right image 26e whose parallax direction is the horizontal direction (lateral direction) are displayed directly as the left-eye image 27 and the right-eye image 28 of the stereoscopic image 29 on the display section 43, the observer of the display section 43 can recognize a solid. Further, the direction of the images does not provide a sense of discomfort. However, when the upper image 23f and the lower image 24f whose parallax direction is the vertical direction (longitudinal direction) are displayed directly as the left-eye image 27 and the right-eye image 28 on the display section 43, namely, even when the stereoscopic image 29 for the upper image 23f and the lower image 24f is generated by the same generating method as the method for generating the stereoscopic image 29 for the left image 25e and the right image 26e whose parallax direction is the horizontal direction (lateral direction), the observer of the display section 43 cannot recognize a solid or even if recognized, feels a sense of discomfort as to the direction of the image.

In such a manner, in the stereoscopic image, a difference between the arrangement direction of the observer's both eyes and the parallax direction of the stereoscopic image influences visibility of the stereoscopic image. For this reason, in order to generate a stereoscopic image such that that the observer can recognize a solid based on the upper image 23f and the lower image 24f having parallax of the vertical direction and the observer does not feel a sense of discomfort as to the direction of the image, a generating process that is different from the generating process for the stereoscopic image for the left image 25e and the right image 26e having parallax in the horizontal direction (lateral direction) should be adopted.

A single image that may be visually recognized by the observer as a two-dimensional image does not have parallax. For this reason, even when the direction of the image is a direction different from the arrangement direction of the observer's both eyes, the direction of the image does not influence the visibility of the image as a two-dimensional image. For example, even when the observer feels a sense of discomfort about the direction of a subject image different from the actual direction, the direction of the image is relatively changed with respect to the observer, so that the sense of discomfort as to the direction of the image can be eliminated without deteriorating the visibility of the two-dimensional image. Therefore, in generation of a single image that may be visually recognized by the observer as the two-dimensional image, the generating process for an image does not have to be switched according to the posture of the camera.

In the information processor 100A, the geometrical relationship between the arrangement direction of the first camera 61 and the second camera 62 and the horizontal direction is determined, and the generating process A or the generating process B that are different from each other is selectively executed according to a determination result so that the stereoscopic image of the subject is generated. Therefore, in the information processor 100A, even when the arrangement direction of the first camera 61 and the second camera 62 is the horizontal direction, and is different from the horizontal direction, an image group of a subject having parallax in the horizontal direction in the actual subject can be generated as a stereoscopic image of the subject. The generating processes are described below. In this application, a term "source image" is used as a name of the image of the subject that is used as the image composing the stereoscopic image 29 with being spatially deformed in an image space or directly without being deformed.

Figure 28:
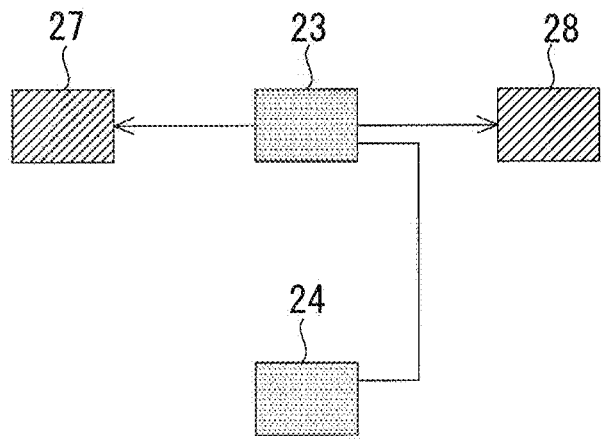
FIG. 28 is a diagram for describing one example of a correspondence relationship between the upper image and the lower image, and respective stereoscopic images.

The Generating Process A:

FIG. 28 is a diagram for describing one example of a correspondence relationship in the generating process A for the upper image 23 and the lower image 24 captured by the second camera 62 and the first camera 61 of the information processor 100A in the posture shown in FIG. 3 and for the left-eye image 27 and the right-eye image 28 as the stereoscopic image.

In the generating process A, as shown in FIG. 28, any one of the upper image 23 and the lower image 24 is specified as the source image, and spatial deformation in an image pace of the source image is carried out on the specified source image so that the left-eye image 27 and the right-eye image 28 are generated.

Figure 9:
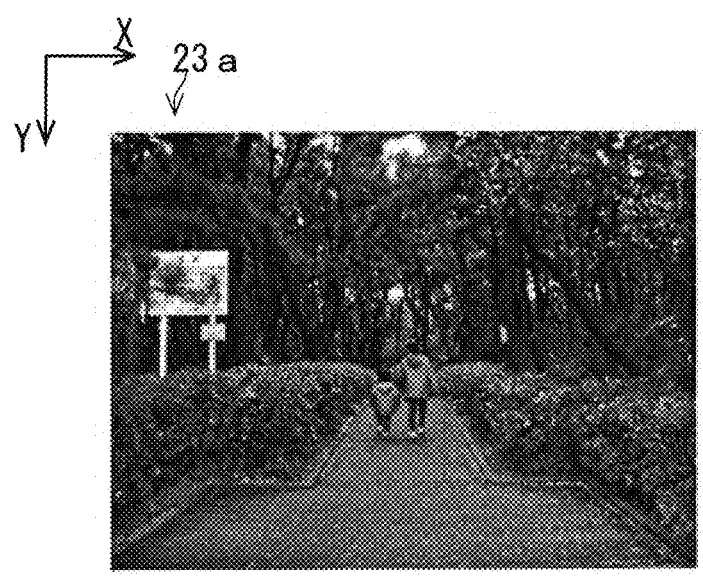
FIG. 9 is a diagram illustrating one example of the upper image.
Figure 10:
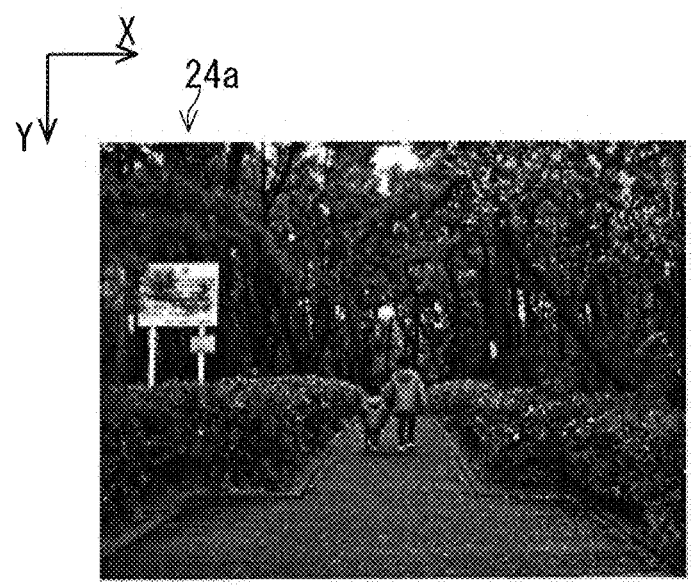
FIG. 10 is a diagram illustrating one example of the lower image.
Figure 11:
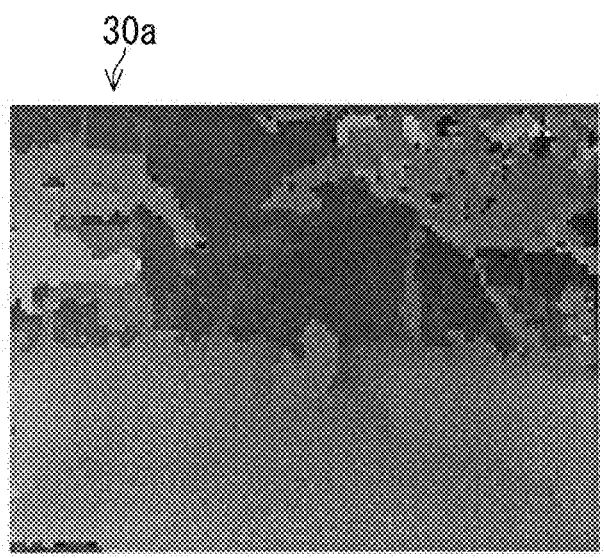
FIG. 11 is a diagram illustrating one example of a parallax image.
Figure 12:
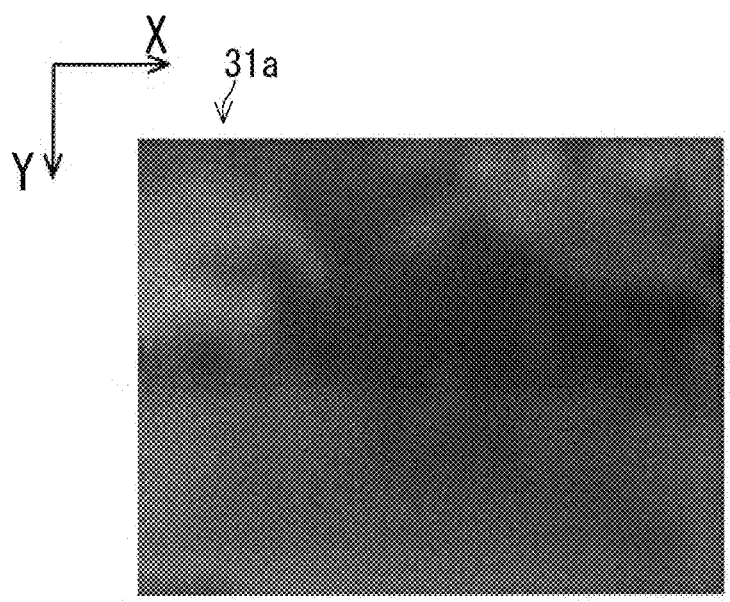
FIG. 12 is a diagram illustrating one example of the parallax image.
Figure 13:
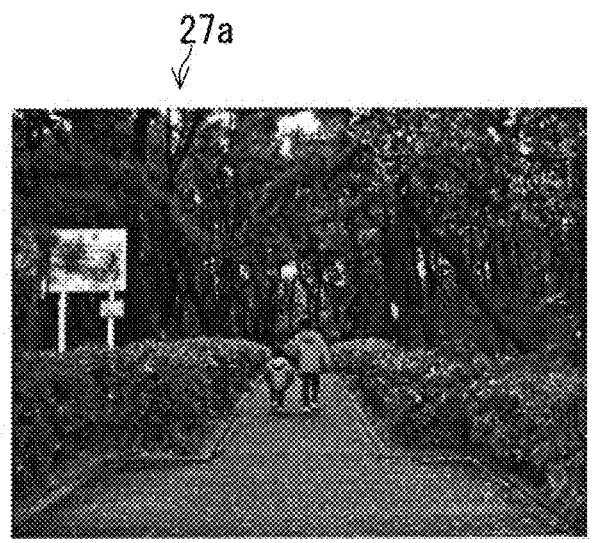
FIG. 13 is a diagram illustrating one example of a left-eye image.
Figure 14:
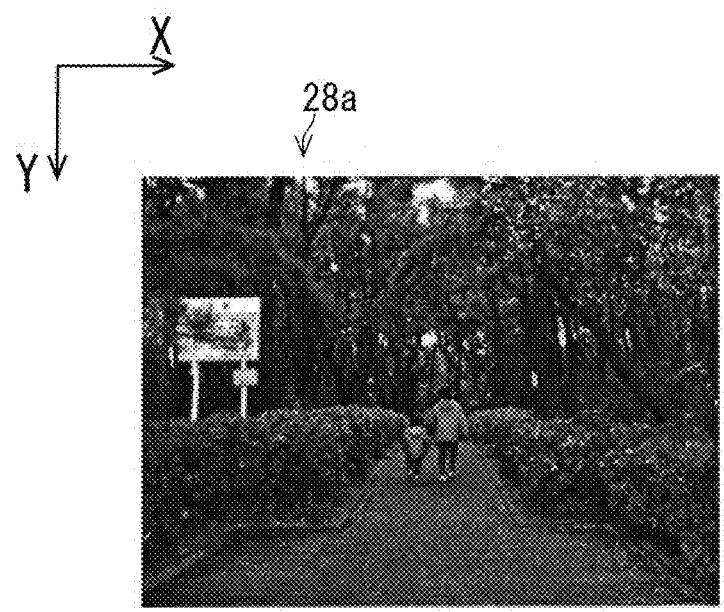
FIG. 14 is a diagram illustrating one example of a right-eye image.

FIG. 9 is a diagram illustrating the upper image 23a as one example of the upper image 23. Further, FIG. 10 is a diagram illustrating the lower image 24a as one example of the lower image 24. Further, FIG. 11 is a diagram illustrating a parallax image 30a as one example of a parallax image. Further, FIG. 12 is a diagram illustrating a parallax image 31a as one example of a parallax image. Further, FIG. 13 is a diagram illustrating a left-eye image 27a as one example of the left-eye image 27. Further, FIG. 14 is a diagram illustrating a right-eye image 28a as one example of the right-eye image 28. In FIG. 9 to FIG. 14, for convenience of illustrating, an aspect ratio relating to the number of pixels on the respective images does not always match with an aspect ratio of the actual image. Further, much the same is true on the respective images in FIG. 20 to FIG. 27, described later.

As a result of checking in step S150 in FIG. 32, the arrangement direction of the first camera 61 and the second camera 62 is determined as being other than the horizontal direction, the generating section 16 specifies any one of the first image 21 and the second image 22 as the source image (step S160 in FIG. 33). Even when the generating section 16 specifies one image displayed on the display section 43 in the first image 21 and the second image 22 as the source image and executes the generating process A, the usability of the present invention is not deteriorated. When the image displayed on the display section 43 is specified as the source image, and the display of the source image and the display of the stereoscopic image generated from the source image are changed in the display section 43, the observer who observes the display section 43 at the time of change does not feel a sense of discomfort.

When the upper image 23a (FIG. 9) is specified as the source image similarly to the example shown in FIG. 28, the generating section 16 obtains the parallax image 30a (FIG. 11) of the upper image 23a that is the source image (step S170 in FIG. 33).

The "parallax image" means an image where parallax of respective pixels on one image of two images obtained by photographing one subject from different viewpoints (directions) and corresponding pixels on the other image corresponding to the pixels on one image is arranged according to pixel arrangement of the pixels on one image. As expressed by the formula (1), since the parallax and the distance can be converted, when a distance of each point of a subject is used on the parallax image instead of the parallax, the parallax image is also called "distance image". The respective corresponding pixels on the other image corresponding to the pixels on one image are, for example, specified by executing a corresponding point searching process using a correlative arithmetic method target for one image and the other image. As the correlative arithmetic method used for the corresponding point searching process, for example, an NCC (Normalized Cross Correlation) method, a SAD (Sum of Absolute Difference) method, or a POC(Phase Only Correlation) method is used. The generating section 16 executes the corresponding point searching process on the upper image 23a and the lower image 24a (FIG. 10) based on the upper image 23a (FIG. 9) so as to obtain the parallax image 30a (FIG. 11).

Further, even when as another method for obtaining the parallax image of the source image in the upper image 23 and the lower image 24, a method that does not use an unspecified image as the source image is adopted, the usability of the present invention is not deteriorated. Normally, since chroma of an image obtained by capturing a subject is higher as being closer to the subject and the chroma is lower as being farther from the subject, the distances corresponding to the pixels on the source image can be estimated based on, for example, the chroma of the source image. Further, various methods can be adopted as a method for enabling the distance to be estimated based on a single source image, such as a method for estimating the distance according to a portion on the image. Further, the distance obtained by estimating based on the single source image may be converted into parallax by, for example, the formula (1) so as to be obtained. That is to say, even when the generating section 16 executes the generating process A based on information about the distance between the stereo camera 300 and the subject estimated from any one of the upper image 23 and the lower image 24, the usability of the present invention is not deteriorated. In this application, the term "distance information" is used as a general name of parallax and distance.

Further, when the generating section 16 executes the generating process A based on the distance information estimated from any one of the upper image 23 and the lower image 24, any one of the upper image 23 and the lower image 24, namely, only the source image is captured, the usability of the present invention is not deteriorated.

When the parallax image 30a is obtained, the generating section 16 executes a smoothing process on the parallax image 30a (step S180 in FIG. 33), and generates the parallax image 31a (FIG. 12) as a result of the smoothing process. The smoothing process is executed in order to, for example, reduce a random noise of the parallax image 30a caused by an error of searching in the corresponding point searching process and generate parallax of pixels where corresponding points are not obtained using parallax of peripheral pixels. As the smoothing process, smoothing filter processes using various smoothing filters such as an averaging filter, a median filter and a Gaussian filter are adopted. Further, smoothing strength of the smoothing filter can be changed by, for example, changing a size of the filter. When an averaging filter is adopted as the smoothing filter, and an image size of the parallax image 30a is, for example, 3456 pixels×2592 pixels, a value of about 150 to 300 pixels (elements) is adopted as the size of the averaging filter whose numbers of pixels (a number of elements) are equal to the respective longitudinal and lateral directions. Even when the smoothing process in step S180 is not executed on the parallax image 30a, the usability of the present invention is not deteriorated. Further, much the same is true on the smoothing process in step S220 in FIG. 34, described later.

When the smoothing process in step S180 is ended, the generating section 16 adjusts the parallax value of the parallax image 31a (step S190 in FIG. 33). When the adjustment of parallax is ended, the generating section 16 generates the left-eye image 27a (FIG. 13) and the right-eye image 28a (FIG. 14) based on the parallax image 31a (FIG. 12) whose parallax is adjusted (step S200 in FIG. 33).

Figure 15:
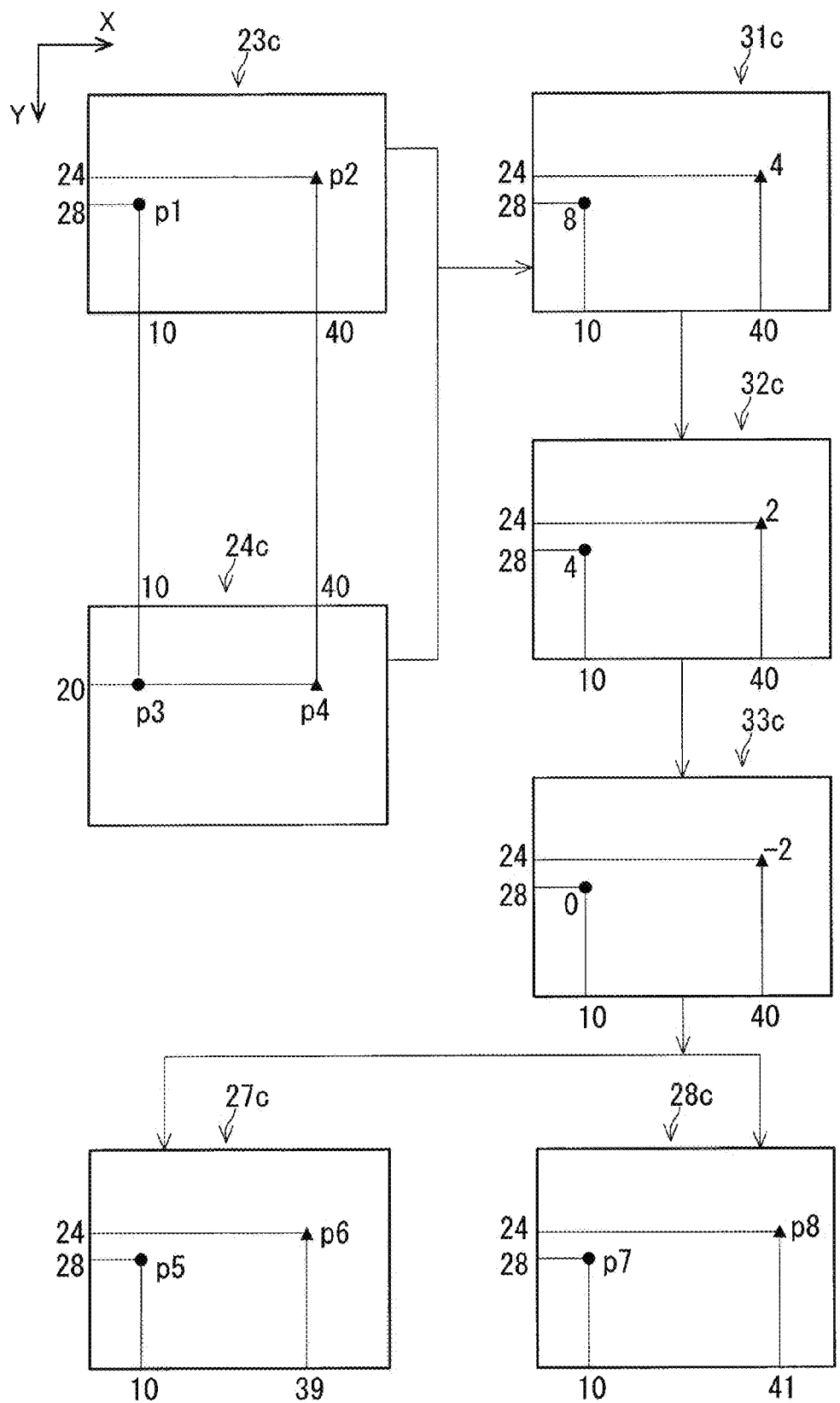
FIG. 15 is a diagram illustrating a concept of one example of a procedure for generating a stereoscopic image.

Parallax Adjusting Step In the Generating Process A:

FIG. 15 is a diagram illustrating a concept of one example of the procedure for generating a stereoscopic image in the generating process A. FIG. 15 illustrates a concept of one example of a procedure for generating a left-eye image 27c and a right-eye image 28c based on the upper image 23c and the lower image 24c through the generating process A. The parallax adjusting step (step S190 in FIG. 33) in the generating process A is described in detail below suitably with reference to FIG. 15. In FIG. 15, for convenience of illustrating, the number of pixels of each image in imaging device in a main scanning direction (horizontal scanning direction) and the number of pixels in a vice-scanning direction (vertical scanning direction) are different from the number of pixels actually corresponding to the imaging device. Further, one coordinate system that is expressed as a representative of the direction of image coordinate systems in respective images is provided, and an origin of each image in the image coordinate system is an upper left end (−X end and −Y end) of each image. Further, the number of pixels and the image coordinate system of each image in FIG. 16 and FIG. 17, described later, are similar to those in FIG. 15.

One of the objects for adjusting parallax is to repress a phenomenon where stereoscopic view is impossible because the magnitude of parallax with respect to the number of pixels of a stereoscopic image in the horizontal direction is too large and thus the observer of the stereoscopic image cannot relate corresponding points on the left-eye image 27 and the right-eye image 28 with each other. Further, another object for adjusting parallax is, for example, to set a shortest distance with which the observer senses a stereoscopic image to the distance of the display section 43. Further, even when parallax is not adjusted in step S190, the usability of the present invention is not deteriorated. Further, much the same is true on the parallax adjustment in step S230 in FIG. 34, described later.

In FIG. 15, a pixel p1 of a coordinate (10, 28) and a pixel p2 of a coordinate (40, 24) are set on the upper image 23c. Further, a pixel p3 of a coordinate (10, 20) and a pixel p4 of a coordinate (40, 20) are set on the lower image 24c. The pixel p1 and p3 correspond to the same point on a subject, and the pixel p2 and p4 also correspond to the same point on the subject.

A parallax image 31c (FIG. 15) is a parallax image of the upper image 23c and the lower image 24c at a time when the upper image 23c is set as a source image based on the upper image 23c, and is subject to the smoothing process in step S180. On parallax image 31c, parallax values corresponding to the pixels p1 and p2 of the upper image 23c are 8 and 4. The pixel p1 and the pixel p2 on the upper image 23c are pixels corresponding to a point on a subject farthest from and a point closest to the stereo camera 300, respectively. Therefore, the parallax 8 is the maximum parallax on the parallax image 31c, and the parallax 4 is the smallest parallax. Further, a relationship between a pixel q1 and a pixel q2 in FIG. 16, described later, is similar to a relationship between the pixel p1 and the pixel p2.

A parallax image 32c (FIG. 15) is a parallax image having parallax d2 of a result of adjusting respective parallax values on the parallax image 31c according to formulas (2) and (3) as a parallax value. Each parallax value on the parallax image 32c is obtained based on value Wmax of 2 in the formula (2), namely, value k1 of 0.5. On the parallax image 32c, the parallax values corresponding to the pixels p1 and p2 of the upper image 23c are 4 and 2. In the formula (3), in order to repress the phenomenon that stereoscopic viewing is impossible due to a too large parallax value of the stereoscopic image, the parallax of the parallax image 31c is adjusted so that a maximum value of a distribution width of parallax on the parallax image 32c is Wmax. Even when parallax in parallax of the parallax image 31c that is smaller than Wmax is not adjusted according to the formula (3), the usability of the present invention is not deteriorated.

A parallax image 33c (FIG. 15) is a parallax image having parallax d3 that is a result of adjusting each parallax on the parallax image 32c according to a formula (4) as a parallax value. On the parallax image 33c, the parallax values corresponding to the pixels p1 and p2 of the upper image 23c are 0 and −2, respectively. In the formula (4), in order to set the shortest distance with which the observer senses the stereoscopic image to the distance of the display section 43, each parallax value on the parallax image 32c is totally shifted. When the parallax image 33c is generated, the parallax adjusting process is ended. Further in parallax adjusting step in the generating process B shown in step S230 in FIG. 34, described later, similarly to the parallax adjusting step in the generating process A, the parallax adjusting process is executed according to the formulas (2) to (4).

[Mathematical Formula 2]

$$k1 = W\max/Wo \quad (2)$$

$$d2 = k1 \times d1 \quad (3)$$

$$d3 = d2 - d2\max \quad (4)$$

wherein k1: scaling coefficient

Wmax: upper limit value of the parallax distribution width after scaling

Wo: original parallax distribution width corresponding to the source image d1: original parallax corresponding to pixels of the source image d2: parallax corresponding to the pixels of the source image after scaling d2max: maximum value of each parallax after scaling d3: parallax corresponding to the pixels of the source image after parallax adjustment Step of Generating Stereoscopic Image in the Generating Process A The step of generating a stereoscopic image (step S200 in FIG. 33) in the generating process A is described in detail below with reference to FIG. 15.

(a-1) Calculation of Pixel Shift Value

When the parallax adjustment (step S190 in FIG. 33) is ended, the step of generating a stereoscopic image (step S200 in FIG. 33) is started, and the pixel shift value in the generating process A is calculated according to formulas (5) and (6). The process for calculating the pixel shift value is a process for sorting each parallax in the parallax image (for example, the parallax image 33c in FIG. 15) whose parallax corresponding to one source image (for example, the upper image 23c in FIG. 15) is adjusted, into the left-eye image 27 and the right-eye image 28 based on a share rL of the pixel shift on the left-eye image 27 and a share rR of the pixel shift on the right-eye image 28. A pixel shift value dL of the pixels on the left-eye image 27 is calculated according to the formula (5), and a pixel shift value dR of the pixels on the right-eye image 28 is calculated according to the formula (6). When, for example, parallax of a parallax image is allocated equally to the left-eye image 27 and the right-eye image 28, values of the shares rL and rR are 0.5. Further, for example, when the parallax of the parallax image is allocated to any one of the left-eye image 27 and the right-eye image 28, the share of one image is 1, and the share of the other one is 0. In such a manner, the values of the shares rL and rR are adjusted between 0 to 1, so that a percentage at a time when the parallax on a parallax image where the parallax is adjusted is allocated to the left-eye image 27 and the right-eye image 28 can be suitably adjusted. In formulas (9) and (10) in which the pixel shift value calculating process in the generating process B, described later, is defined, the parallax to be allocated is different from one in the generating process A, but the function and the setting method of the shares rL and rR are similar to the function and the setting method of the shares rL and rR in the formulas (5) and (6).

[Mathematical Formula 3]

$$dL = d3 \times rL \quad (5)$$

$$dR = d3 \times rR \quad (6)$$

wherein dL: the pixel shift value with respect to the pixels of the left-eye image dR: the pixel shift value with respect to the pixels of the right-eye image d3: parallax corresponding to the pixels of the source image after pixel adjustment rL: share of the pixel shift of the left-eye image rR=1−rL: share of the pixel shift of the right-eye image (a-2) Calculation of Coordinate of Stereoscopic Image When the pixel shift values of the left-eye image 27 and the right-eye image 28 are calculated, an X coordinate of the pixel of the left-eye image 27 is calculated by the formula (7), and an X coordinate of the pixel of the right-eye image 28 is calculated by the formula (8).

[Mathematical Formula 4]

$$XbL = Xa + dL \quad (7)$$

$$XbR = Xa - dR \quad (8)$$

wherein XbL: X coordinate of the pixel of the left-eye image

XbR: X coordinate of the pixel of the right-eye image

Xa: X coordinate of the pixel of the source image dL: the pixel shift value with respect to the pixel of the left-eye image dR: the pixel shift value with respect to the pixel of the right-eye image (a-3) Generation of Stereoscopic Image By Means of Pixel Shift When the X coordinates of the pixels of the left-eye image 27 and the right-eye image 28 corresponding to the pixels on the source image are calculated, the pixels of the source image are shifted based on the calculated X coordinates so that the left-eye image 27 and the right-eye image 28 are generated.

For example, the left-eye image 27c and the right-eye image 28c in FIG. 15 are a stereoscopic image generated by using the parallax image 33c. The pixels p1 and p2 on the upper image 23 that is the source image are shifted to a pixel p5 of a coordinate (10, 28) and a pixel p6 of a coordinate (39, 24) on the left-eye image 27c. Further, the pixels p1 and p2 are shifted to a pixel p7 of a coordinate (10, 28) and a pixel p8 of a coordinate (41, 24) on 28c.

Figure 35:
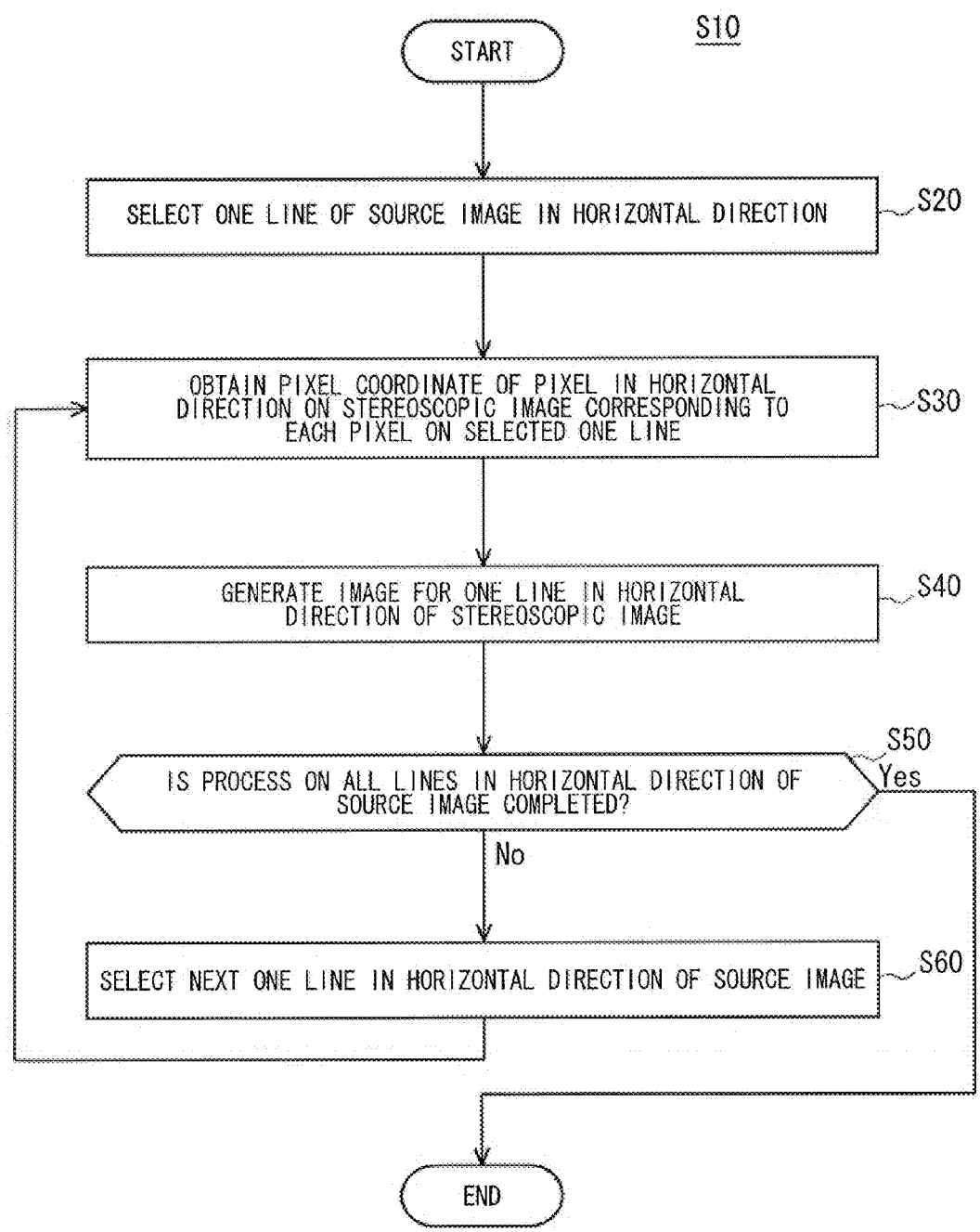
FIG. 35 is a diagram illustrating an operation flow of the information processor according to the embodiment.

A procedure for generating an entire stereoscopic image from the source image through the pixel shift is described below as an example of generating the left-eye image 27. The pixel shift is, as described above, also a process for spatially shifting the pixel value of the source image in pixel unit. FIG. 35 is a diagram illustrating one example of the operation flow S10 in which the information processor 100A generates a stereoscopic image through the pixel shift. When the process of the operation flow S10 in FIG. 35 is started, a partial image 58a (FIG. 18) for one line of the horizontal scanning direction (X-axial direction) at the upper end (−Y-directional end) of the source image is selected (step S20).

Figures 18, 19:
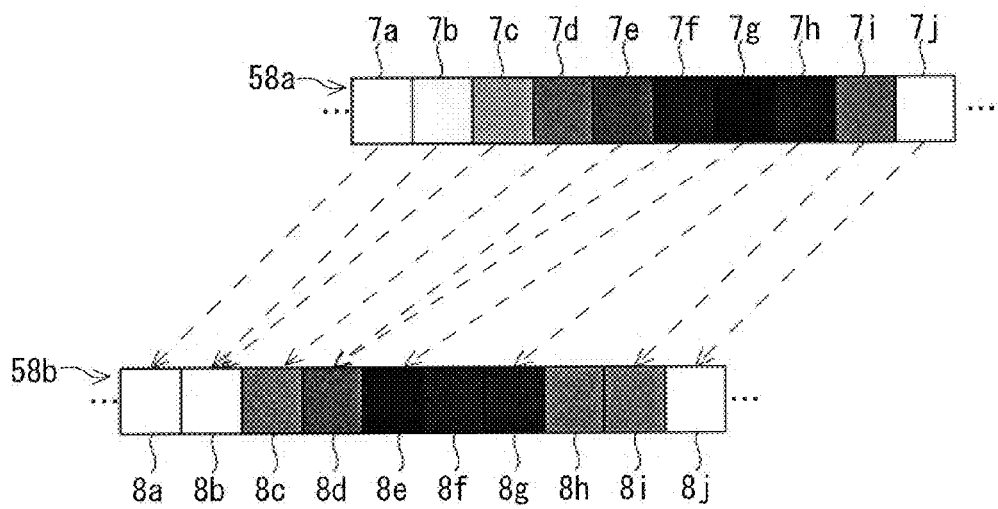
FIG. 18 is a diagram illustrating one example of a correspondence relationship between respective pixels on a partial image of a source image and on a partial image of the stereoscopic image.
FIG. 19 is a diagram illustrating one example of a correspondence relationship between a pixel coordinate and a pixel shift length of the partial image of the source image, and a pixel coordinate of the partial image of the stereoscopic image.

FIG. 18 is a diagram illustrating one example of a correspondence relationship between some respective pixels 7a to 7j of the partial image 58a for one line in the horizontal scanning direction (X-axial direction) at the upper end (−Y-directional end) of the source image, and some respective pixels 8a to 8j of a partial image 58b for one line of the horizontal scanning direction at the upper end (−Y-directional end) of the left-eye image 27 corresponding to the source image. Further, the partial image 58a and the partial image 58b correspond to the same portions of a subject, respectively. In order to easily understand the correspondence relationship, the pixels 7a to 7j and the pixels 8a to 8j are sectioned by shading according to the pixel values so as to be displayed.

FIG. 19 is a diagram illustrating one example of a correspondence relationship between the pixel coordinates and the pixel shift values of the pixels 7a to 7j of the partial image 58a (FIG. 18) of the source image, and the pixel coordinates of the pixels 8a to 8j on the partial image 58b (FIG. 18) of the stereoscopic image (left-eye image 27). The first and fifth lines in FIG. 19 illustrate pixel numbers that specify the pixels 7a to 7j of the partial image 58a, and pixel numbers that specify the pixels 8a to 8j of the partial image 58b. Further, the second line of FIG. 19 illustrates the X coordinates of the pixels 7a to 7j related with the pixel numbers shown on the first line. Further, the third line of FIG. 19 illustrates the pixel shift values corresponding to the pixels 7a to 7j related with the pixel numbers shown on the first line.

When the partial image 58a for one line of the source image is selected in step S20 in FIG. 35, the pixels corresponding to the respective pixels of the selected partial image 58a on the left-eye image 27, namely, the pixel coordinates (X coordinates) of the pixels 8a to 8j of the partial image 58b in the horizontal scanning direction (X-axial direction) are obtained (step S30 in FIG. 35).

As described before, the X coordinates of the pixels of the partial image 58b are calculated according to the formula (7) using the pixel shift value calculated by the formula (5). The fourth line of FIG. 19 illustrates the X coordinates of the pixels 8a to 8j calculated by the formula (7) with being related with pixel numbers shown on the fifth line.

When the pixel coordinates of the pixels on the partial image 58b for one line in the horizontal direction of the left-eye image 27 are obtained, the pixel values of the pixels on the partial image 58b are obtained. That is to say, an image of the partial image 58b for 1 line is generated (step S40 in FIG. 35). A process in step S40 is then described by using the pixels 7a to 7j of the partial image 58a shown in FIG. 18 and the pixels 8a to 8j of the partial image 58b as examples.

According to the X coordinates of the pixels 8a to 8j shown on the fourth line of FIG. 19, the pixels 7a, 7b, 7c, 7d, 7e, 7f, 7g, 7h, 7i and 7j of the partial image 58a correspond to the pixels 8a, 8b, 8b, 8c, 8d, 8d, 8e, 8g, 8i and 8j of the partial image 58b , respectively. That is to say, the pixels 8a to 8j include three kinds of pixels including a first kind of a pixel corresponding to one of the pixels 7a to 7j, and a second kind of pixels corresponding to two of them, and a third kind of pixels that do not correspond to any of the pixels 7a to 7j.

In the process in step S40 in FIG. 35, the pixel values of the pixels on the partial image 58a corresponding to these pixels are adopted as the pixels value of the first kind of pixel, and a representative value of the pixel values of the two pixels on the partial image 58a corresponding to these pixels is adopted as the second kind of pixel, for example, an average value. Further, as the pixel values of the third kind of pixels, for example, a pixel value of the pixel in the pixels on the partial image 58b whose pixel values are obtained based on a correspondence relationship with respect to the partial image 58a that is the closest to the third kind of the pixels is adopted. The image of the partial image 58b is specified by the pixel coordinates (X coordinates) specified for the pixels on the partial image 58b and the pixel values.

When the process in step S40 is ended, a check is made if the process for generating a corresponding partial image of the left-eye image 27 for all the lines in the horizontal direction (X-axial direction) of the source image (steps S30 to S40) is ended (step S50 in FIG. 35). As a result of checking in step S50, when the process for all the lines in the horizontal direction is not ended, a line next to the processed line in the +Y direction on the first image 21 is selected as a new target for the process (step S60 in FIG. 35), and the process returns to step S30. Further, as a result of checking in step S50, when the process for generating the partial image of the left-eye image 27 for all the lines in the horizontal direction is ended, the generating process for the left-eye image 27 is ended.

The source image may be deformed based on parallax with a pixel size being used as a minimum unit. Therefore, when parallax is obtained in unit of the pixel size, a stereoscopic image can be obtained, but, for example, even if the parallax is obtained in sub-pixel unit by searching for a corresponding point for obtaining parallax in sub-pixel unit not more than the pixel size, a stereoscopic image can be obtained by the deformation in pixel unit at a time of deforming the source image based on parallax, and thus the usability of the present invention is not deteriorated.

The formula for obtaining the pixel shift value and the formula for obtaining the X coordinate of a pixel on a stereoscopic image are different from the procedure described with reference to FIG. 35, but the process for generating the right-eye image 28 from the source image through the pixel shift in the generating process A, and a process for generating the left-eye image 27 and the right-eye image 28 from the source image through the pixel shift in the generating process B, described later, are also realized by the procedure described above with reference to FIG. 35.

Figure 29:
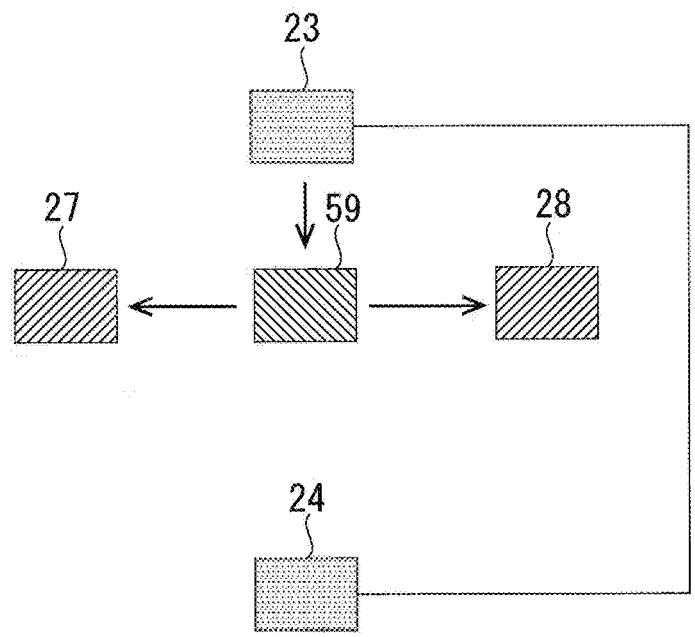
FIG. 29 is a diagram for describing one example of the correspondence relationship between the upper image and the lower image, and the respective stereoscopic images.

FIG. 29 is a diagram for describing one example of a correspondence relationship between the upper image 23 and the lower image 24 captured by the second camera 62 and the first camera 61 at the posture of the information processor 100A shown in FIG. 3, and the left-eye image 27 and the right-eye image 28 as a stereoscopic image in the generating process A similarly to FIG. 28. In the example of FIG. 29, the generating section 16 executes the generating process A for once shifting the pixels on the upper image 23 to the vertical direction based on the parallax of the upper image 23 and the lower image 24 so as to generate an intermediate image 59, and generating the left-eye image 27 and the right-eye image 28 using the intermediate image 59 as a new source image. In such a manner, even when the generating section 16 executes the generating process A for generating the intermediate image 59 obtained by spatially deforming any one of the upper image 23 and the lower image 24 in the image space using the intermediate image 59 as a new source image, the stereoscopic image 29 can be generated, and thus the usability of the present invention is not deteriorated.

When the generating process (step S200 in FIG. 33) for a stereoscopic image in the generating process A is ended, the process transfers to a process for displaying the stereoscopic image (step S250 in FIG. 34). The process for displaying a stereoscopic image is the same as a process for displaying a stereoscopic image in the generating process B, described later. The process for displaying a stereoscopic image in the generating processes A and B is described later.

In the generating process A, even when the arrangement direction of the first camera 61 and the second camera 62 is oblique to the horizontal direction, only any one of the first image 21 and the second image 22 is adopted as the source image. Therefore, since the left-eye image 27 and the right-eye image 28 are generated from a single source image, a parallax component in the vertical direction is not generated similarly to the case where the arrangement direction of the left-eye image 27 and right-eye image 28 is the vertical direction.

Figures 30, 31:
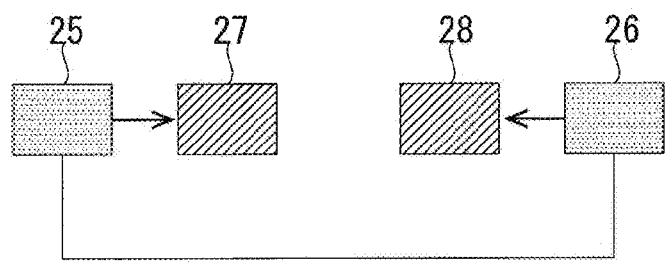
FIG. 30 is a diagram for describing one example of the correspondence relationship between the left image and the right image, and the respective stereoscopic images.
FIG. 31 is a diagram illustrating one example of correspondence between the stereoscopic image and posture information about the information processor.

Generating Process B:

FIG. 30 is a diagram for describing one example of a correspondence relationship between the left image 25 and the right image 26 captured by the first camera 61 and the second camera 62 and the left-eye image 27 and the right-eye image 28 as the stereoscopic image in the generating process B in the information processor 100A at the posture shown in FIG. 2.

In the generating process B, as shown in FIG. 30, the left image 25 and the right image 26 are specified as the source image. The left-eye image 27 is generated by spatially deforming the left image 25 in the image space of the left image 25, and the right-eye image 28 is generated by spatially deforming the right image 26 in the image space of the right image 26.

Figure 20:
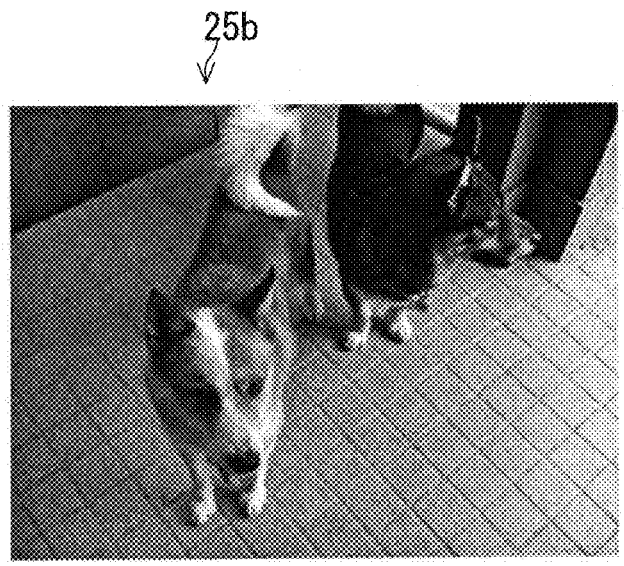
FIG. 20 is a diagram illustrating one example of a left image.
Figure 21:
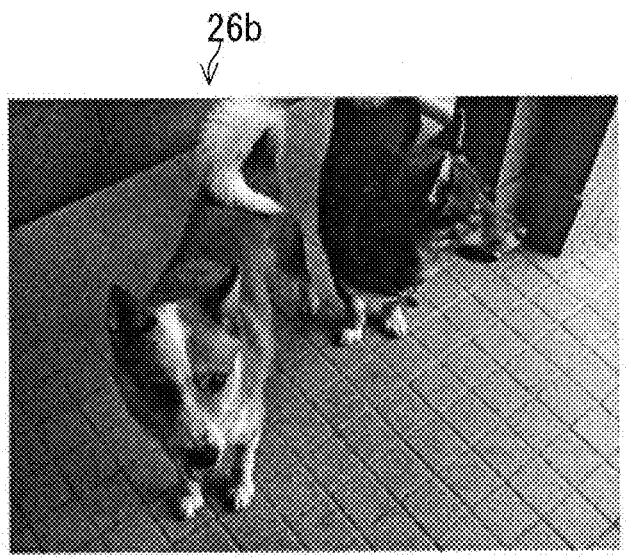
FIG. 21 is a diagram illustrating one example of a right image.
Figure 22:
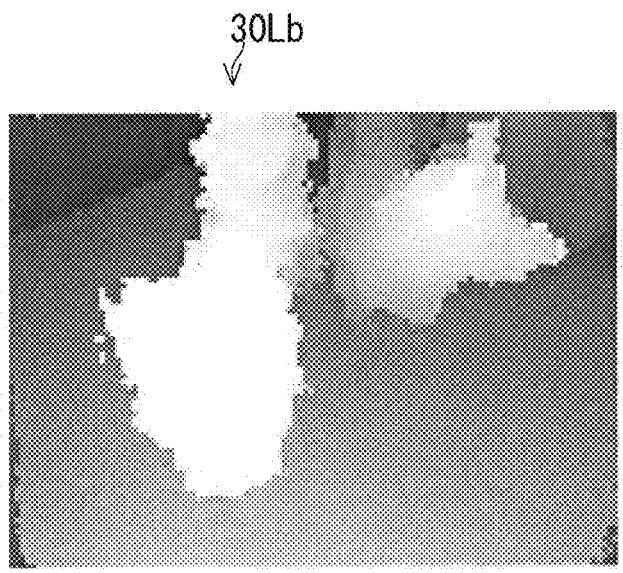
FIG. 22 is a diagram illustrating one example of a parallax image of the left image.
Figure 23:
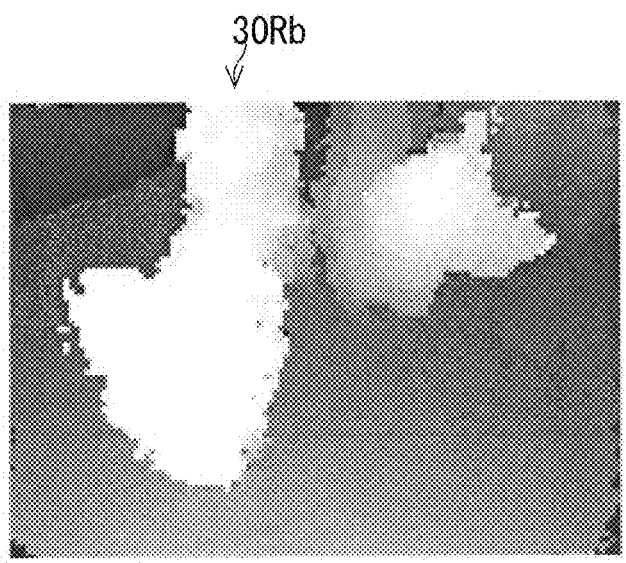
FIG. 23 is a diagram illustrating one example of a parallax image of the right image.
Figure 24:
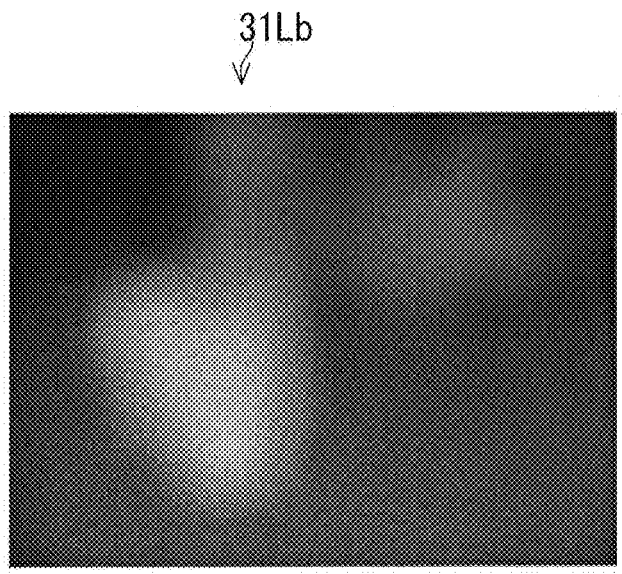
FIG. 24 is a diagram illustrating one example of the parallax image of the left image.
Figure 25:
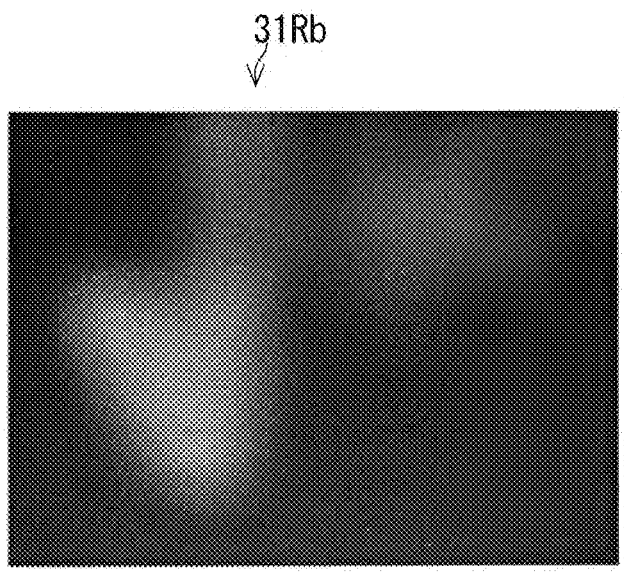
FIG. 25 is a diagram illustrating one example of the parallax image of the right image.
Figure 26:
FIG. 26 is a diagram illustrating one example of the left-eye image.
Figure 27:
FIG. 27 is a diagram illustrating one example of the right-eye image.

FIG. 20 is a diagram illustrating a left image 25b as one example of the left image 25. Further, FIG. 21 is a diagram illustrating a right image 26b as one example of the right image 26. Further, FIG. 22 is a diagram illustrating a parallax image 30Lb as one example of a parallax image of the left image 25b. Further, FIG. 23 is a diagram illustrating a parallax image 30Rb as one example of a parallax image of the right image 26b. Further, FIG. 24 is a diagram illustrating a parallax image 31Lb as one example of a parallax image of the left image 25b. Further, FIG. 25 is a diagram illustrating a parallax image 31Rb as one example of a parallax image of the right image 26b. Further, FIG. 26 is a diagram illustrating a left-eye image 27b as one example of the left-eye image 27. Further, FIG. 27 is a diagram illustrating a right-eye image 28b as one example of the right-eye image 28.

As a result of checking in step S150 in FIG. 32, when the arrangement direction of the first camera 61 and the second camera 62 is determined as the horizontal direction, the generating section 16 specifies the first image 21 and the second image 22 as the source image similarly to the example shown in FIG. 30. The generating section 16 then obtains the second image 22 based on the left image 25b, namely, the parallax image 30Lb with respect to the right image 26b as to the first image 21 as the source image, namely, the left image 25b. Similarly, the generating section 16 obtains the parallax image 30Rb with respect to the left image 25b based on the right image 26b as to the second image 22 as the source image, namely, the right image 26b (step S210 in FIG. 34). These parallax images are obtained in a manner that the generating section 16 execute the corresponding point searching process similarly to the generating process A. Further, in the generating process for parallax images in the information processor 100A, a parallax image is generated so that a parallax value is larger as a subject being closer to the stereo camera 300 even in a case where the parallax image is generated based on the left image 25b or the right image 26b.

When the parallax images 30Lb and 30Rb are obtained, the generating section 16 executes the smoothing process on the parallax images 30Lb and 30Rb (step S220 in FIG. 34), and generates the parallax images 31Lb and 31Rb (FIG. 24 and FIG. 25, respectively) as a result of the smoothing process.

When the smoothing process in step S220 is ended, the generating section 16 makes parallax adjustment for adjusting parallax values of the parallax images 31Lb and 31Rb (step S230 in FIG. 34). When the parallax adjustment is ended, the generating section 16 generates the left-eye image 27b (FIG. 26) and the right-eye image 28b (FIG. 27) based on the parallax images 31Lb and 31Rb whose parallax is adjusted (step S240 in FIG. 34).

Figure 16:
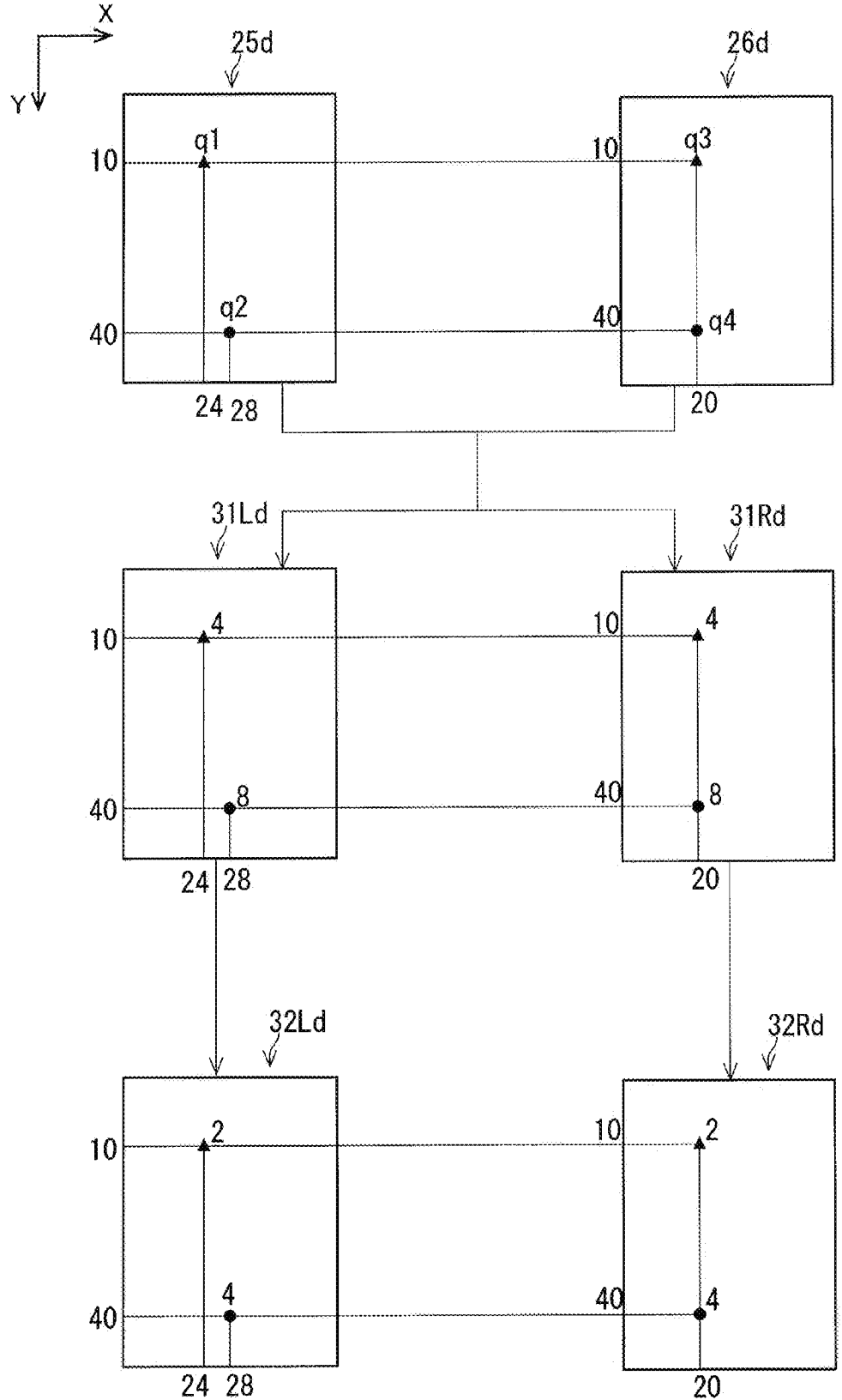
FIG. 16 is a diagram illustrating a concept of one example of a procedure for generating a stereoscopic image.

Parallax Adjusting Step in the Generating Process B:

FIG. 16 and FIG. 17 are diagrams illustrating concepts of one example of the procedure for generating a stereoscopic image in the generating process B. FIG. 16 and FIG. 17 illustrate the concepts of one example of the procedure for generating the left-eye image 27d and the right-eye image 28d based on a left image 25d and a right image 26d through the generating process B. A parallax adjusting step (step S230 in FIG. 34) in the generating process B is described in detail below suitably with reference to FIG. 16 and FIG. 17.

In FIG. 16, the pixel q1 of a coordinate (24, 10) and the pixel q2 of a coordinate (28, 40) are set on the left image 25d. Further, a pixel q3 of a coordinate (20, 10) and a pixel q4 of a coordinate (20, 40) are set on the right image 26d. The pixel q1 and q3 correspond to one point on the subject, and the pixel q2 and q4 also correspond to one point on the subject.

A parallax image 31Ld (FIG. 16) is parallax image of the left image 25d and the right image 26d based on the left mage 25d when the left mage 25d is set as the source image, and is subject to the smoothing process in step S220. A parallax image 31Rd (FIG. 16) is a parallax image of the right mage 26d and the left mage 25d based on the right mage 26d at a time when the right mage 26d is set as the source image, and is subject to the smoothing process in step S220. In the parallax image 31Ld, parallax values corresponding to the pixels q1 and q2 of the left mage 25d are 4 and 8, respectively. The pixel q1 and the pixel q2 on the left mage 25d are pixels corresponding to points on the subject that are the farthest from and the closest to the stereo camera 300, respectively. Therefore, the parallax 8 is the maximum parallax on the parallax image 31Ld, and the parallax 4 is the smallest parallax. On the parallax image 31Rd, parallax values corresponding to the pixels q3 and q4 of the right mage 26d are 4 and 8, respectively. The pixel q3 and the pixel q4 on the right mage 26d are pixels corresponding to points on subject that are the farthest from and the closest to the stereo camera 300, respectively. Therefore, parallax 8 is the maximum parallax on the parallax image 31Rd, and the parallax 4 is the smallest parallax.

Parallax images 32Ld and 32Rd (FIG. 16) are parallax images having parallax d2 that is a result of adjusting the parallax values of the parallax images 31Ld and 31Rd according to the formulas (2) and (3) as parallax values. The respective parallax values of the parallax images 32Ld and 32Rd are obtained with the value Wmax in the formula (2) being 2, namely, the value k1 being 0.5. On parallax image 32Ld, the parallax values corresponding to the pixels q1 and q2 of the left mage 25d are 2 and 4, respectively. On the parallax image 32Rd, the parallax values of the pixels q3 and q4 of the right mage 26d are 2 and 4, respectively.

Parallax images 33Ld (FIGS. 17) and 33Rd (FIG. 1) are parallax images having parallax d3 that is a result of adjusting the respective parallax values of the parallax images 32Ld and 32Rd according to the formula (4) as parallax values. On the parallax image 33Ld, parallax values corresponding to the pixels q1 and q2 of the left mage 25d are −2 and 0, respectively. Further, on parallax image 33Rd, parallax values corresponding to the pixels q3 and q4 of the right mage 26d are −2 and 0, respectively.

Step of Generating Stereoscopic Image in the Generating Process B:

The step (step S240 in FIG. 34) of generating a stereoscopic image in the generating process B is described in detail below suitably with reference to FIG. 16 and FIG. 17.

(b-1) Calculation of Pixel Shift Value:

When the parallax adjustment (step S230 in FIG. 34) is ended, the step of generating a stereoscopic image (step S240 in FIG. 34) is started and the pixel shift value calculating process in the generating process B is executed according to the formulas (9) and (10). The pixel shift value calculating process is a process for allocating a difference between the parallax of the parallax images (the parallax images 33Ld and 33Rd) where the parallax adjustment is ended corresponding to the two source images (the left mage 25d and the right mage 26d) and the parallax of the original parallax images (the parallax image 31Ld and 31Rd) corresponding to the two source images to the left-eye image 27d and the right-eye image 28d based on the share rL of the pixel shift on the left-eye image 27d and the share rR of the pixel shift on the right-eye image 28d. In the generating process B, differently from the generating process A, as shown in FIG. 30, the left-eye image 27d is generated based on the left mage 25d, and right-eye image 28d is generated based on the right mage 26d. Therefore, as expressed by the formulas (9) and (10), the method for calculating parallax to be allocated is different form the generating process A. The pixel shift value dL with respect to the pixel of the left-eye image 27d is calculated by the formula (9), and the pixel shift value dR with respect to the pixel of the right-eye image 28d is calculated by the formula (10). Although the parallax as target to be allocated in the formula (9) and the formula (10) is different from that in the generating process A, functions and a setting method for the shares rL and rR are similar to the function and the setting method for the shares rL and rR.

[Mathematical Formula 5]

$$dL = (d3L - dL1) \times rL \quad (9)$$

$$dR = (d3R - dR1) \times rR \quad (10)$$

wherein dL: pixel shift value with respect to the pixel of the left-eye image dR: pixel shift value with respect to the pixel of the right-eye image d3L: parallax corresponding to the pixel of the left source image after parallax adjustment d3R: parallax corresponding to the pixel of the right source image after parallax adjustment dL1: original parallax corresponding to the pixel of the left source image dR1: original parallax corresponding to the pixel of the right source image rL: share of the pixel shift of the left-eye image rR=1−rL: share of the pixel shift of the right-eye image (b-2) Calculation of Coordinate of Stereoscopic Image:

When pixel shift values of the left-eye image 27d and the right-eye image 28d are calculated, the X coordinate of the pixel on the left-eye image 27d is calculated by a formula (11), and the X coordinate of the pixel on right-eye image 28d is calculated by a formula (12).

[Mathematical Formula 6]

$$XbL = XaL + dL \quad (11)$$

$$XbR = XaR - dR \quad (12)$$

wherein XbL: X coordinate of the pixel of the left-eye image

XbR: X coordinate of the pixel of the right-eye image

XaL: X coordinate of the pixel of the left source image

XaR: X coordinate of the pixel of the right source image dL: pixel shift value with respect to the pixel of the left-eye image dR: pixel shift value with respect to the pixel of the right-eye image (b-3) Generation of Stereoscopic Image Through Pixel Shift:

When the X coordinates of the pixels on the left-eye image 27d and the right-eye image 28d corresponding to the pixels on the source images, namely, the left mage 25d and the right mage 26d are calculated, the pixels on the source images are shifted based on the calculated the X coordinates so that the left-eye image 27d and the right-eye image 28d (in FIG. 17) are generated.

On the generated left-eye image 27d, the pixels q1 and q2 on the left mage 25d as the source image are shifted to a pixel q5 of a coordinate (21, 10) and a pixel q6 of a coordinate (24, 40), respectively. On the generated right-eye image 28d, the pixels q3 and q4 on the right mage 26d as the source image are shifted to a pixel q7 of a coordinate (23, 10) and a pixel q8 of a coordinate (24, 40), respectively.

The entire left-eye image 27d and right-eye image 28d are generated by the process similar to the generating method in the generating process A, described before, with reference to FIG. 18, FIG. 19 and FIG. 35.

When the generating process (step S200 in FIG. 33) for a stereoscopic image in the generating process B is ended, the process transfers to the process for displaying a stereoscopic image in the generating processes A and B (step S250 in FIG. 34).

As described above, the information processor 100A determines the geometrical relationship between the arrangement direction of the first camera 61 and the second camera 62 and the horizontal direction, and selectively executes any one of the generating processes A and B for a stereoscopic image according to the determination result, so that an image group of the subject having parallax in the horizontal direction of the actual subject can be generated as a stereoscopic image of the subject even in a case where the arrangement direction of the first camera 61 and the second camera 62 is the horizontal direction or different from the horizontal direction.

Display Process and Storage Process For Stereoscopic Image:

When the stereoscopic image 29 (FIG. 5) is generated by the generating process A or B, the CPU 11A displays the generated stereoscopic image 29, namely, the left-eye image 27 (FIG. 5) and the right-eye image 28 (FIG. 5) on the display section 43 (step S250 in FIG. 34). Further, in response to an operation for instructing storage of an image from the display section 43, the CPU 11A relates the generated stereoscopic image 29 to the posture information 54 about the information processor 100A at the time when the source image of the stereoscopic image 29 is captured so as to store them in the storage device 46 (step S260 in FIG. 34). The posture information 54 (FIG. 5) is generated by the detecting section 15 based on the determination information 55 (FIG. 5) obtained by the obtaining section 12.

FIG. 31 is a diagram illustrating one example of correspondence between the stereoscopic image 29 and the posture information 54 about the information processor 100A. FIG. 31 illustrates five sets of stereoscopic images on the second to fifth lines. Further, the respective stereoscopic images are related to four index values 0 to 3 representing the postures of the information processor 100A at the time when the source images of the stereoscopic images are captured, respectively. On respective lines after the second line, the first line shows a name of a file for storing the left-eye image 27, the second line shows a name of a file for storing the right-eye image 28, and the third line shows an index value of the posture information about the information processor 100A. Further, data on respective lines after the second line are related with each other so as to be stored in the storage device 46. The respective file names are automatically generated based on, for example, a predetermined naming rule.

For example, when as to a straight line that is perpendicular to the optical axis of the stereo camera 300 and the arrangement direction of the first camera 61 and the second camera 62, the information processor 100A sequentially rotates 90° to a predetermined rotating direction about a rotating axis parallel with the optical axis starting from a state where the straight line and the optical axis are included in a vertical plane at the time of photographing with the stereo camera 300, two kinds of the arrangement directions, such as the vertical direction and the horizontal direction, of the first camera 61 and the second camera 62 are present. Further, four kinds of postures of the information processor 100A are present as illustrated in FIG. 31, for example. The detecting section 15 executes a process for detecting a direction in the two kinds of the arrangement directions of the first camera 61 and the second camera 62 corresponding to the direction of the straight line at the time of photographing by the stereo camera 300 according to a set operation mode, or a process for detecting a posture in the four kinds of postures of the information processor 100A corresponding to the posture of the information processor 100A at the time of the photographing through the stereo camera 300. To detect one of the two kinds of the arrangement directions of the first camera 61 and the second camera 62 means a process for specifying the posture information about the information processor 100A from two kinds of postures that are different by 90° about the optical axis of the stereo camera 300. Further, the process for detecting a posture in the four kinds of postures of the information processor 100A corresponding to the posture of the information processor 100A at the time of photographing through the stereo camera 300 is a process for specifying the posture information about the information processor 100A from the four kinds of postures that are different by every 90° about the optical axis of the stereo camera 300.

The CPU 11A relates the arrangement directions of the first camera 61 and the second camera 62 detected by the detecting section 15, or the posture of the information processor 100A with the stereoscopic image 29 as the posture information about the information processor 100A at a time of capturing the source image. When the CPU 11A, then, temporarily stores the posture information 54 related with the stereoscopic image 29 in the RAM 45, and detects that the operation signal 52 from the operation section 42 is a signal relating to an operation for instructing storage of the generated stereoscopic image, it relates the stereoscopic image 29 with the posture information 54 at the time when the source image of the stereoscopic image is photographed so as to permanently store them in the storage device 46.

When the posture information about the information processor 100A that is related with the stereoscopic image 29 and stored is two kinds of directions, for example, the information processor 100A can determine at least whether the arrangement direction of the first camera 61 and the second camera 62 at the time of capturing the source image is the horizontal direction. For this reason, the information processor 100A can selectively execute the generating process A or the generating process B for the stereoscopic image 29 according to the determination result about the arrangement direction. Therefore, the CPU 11A can generate an image group of a subject having parallax in the horizontal direction in the actual subject as a stereoscopic image of the subject even in a case where the arrangement direction is the horizontal direction or other than the horizontal direction.

When the posture information about the information processor 100A that is related with the stereoscopic image 29 so as to be stored is the above-described four kinds of postures, for example, the posture of the information processor 100A is detected also in a case where the stored stereoscopic image is displayed on the display section 43; therefore, even if the posture of the information processor 100A at the time of display is different from the posture of the information processor 100A at a time when the source image of the stereoscopic image 29 is generated, the stereoscopic image can be displayed so that the observer of the stereoscopic image can visually recognize a solid without feeling a sense of discomfort about the direction of the subject image.

As described above, the CPU 11A makes necessary control over the display section 43 based on the posture information 54 about the information processor 100A obtained by the detecting section 15 so that a parallax direction of a stereoscopic image can be the arrangement direction of observer's both eyes, and a direction of the stereoscopic image can be the same direction as the direction of an actual subject. That is to say, in the information processor 100A, the stereoscopic image can be generated so that a solid can be visually recognized by the observer of the stereoscopic image without feeling a sense of discomfort about the direction of the subject image even in a case where the arrangement direction of the first camera 61 and the second camera 62 is the horizontal direction or is different from the horizontal direction, and a stereoscopic image can be displayed.

<Modified Examples:>

The embodiment of the present invention has been described, but the present invention is not limited to the above embodiment, and various modified examples can be provided.

For example, even if the above-described information processor 100A is a digital still camera or a digital video camera having for example, the stereo camera 300 and the posture sensor 47, the usability of the present invention is not deteriorated.

EXPLANATIONS OF LETTERS OR NUMERALS 100A information processor
200A, 200B housing
400 hinge section
21 first image
22 second image
23 upper image
24 lower image
25 left image
26 right image
27 left-eye image
28 right-eye image
29 stereoscopic image
51 output signal
52 operation signal
53 determination result information
54 posture information
55 determination information
56 control signal
58a, 58b partial image
59 intermediate image
61 first camera
62 second camera
66a, 66b closeup subject
67a, 67b long-distance subject
b base line length

The invention claimed is:

1. An information processor, comprising:
   an imaging section having a first imaging system and a second imaging system for photographing a subject from different directions;
   an obtaining section for obtaining determination information for determining a geometrical relationship between an arrangement direction of said first imaging system and said second imaging system, and a horizontal direction;
   a determination section for determining said geometrical relationship based on said determination information; and
   a generating section for executing one generating process selected from a first generating process and a second generating process that are different from each other according to a determination result of said geometrical relationship based on an imaged result of said imaging section so as to generate a stereoscopic image of said subject;
   wherein a first source image obtained from said imaged result is a target for said first generating process, a second source image obtained from said imaged result is a target for said second generating process, and selecting rules of said first source image and said second source image from said imaged result are different from each other; and
   wherein said selecting rules are such that;
   when said arrangement direction is determined as being the horizontal direction, a first image obtained by said first imaging system and a second image obtained by said second imaging system are adopted as said first source image, and
   when said arrangement direction is determined as being other than the horizontal direction, one image of said first image and said second image is adopted as said second source image.

2. The information processor according to claim 1, wherein said generating section spatially deforms said one image in an image space so as to generate a third image, and executes said second generating process on the third image as said second source image.

3. The information processor according to claim 1, wherein said generating section executes said second generating process based on information about a distance between said imaging section and said subject estimated from said one image.

4. The information processor according to claim 1, further comprising:
   a display section,
   wherein said generating section executes said second generating process on one image displayed on said display section in said first image and said second image as said second source image.

5. The information processor according to claim 1, further comprising:
   a detection section for detecting posture information about said information processor at a time when said imaging section obtains said first and second images based on said determination information; and
   a storage section for relating said stereoscopic image with the posture information about said information processor detected by said detection section so as to store said stereoscopic image.

6. The information processor according to claim 5, wherein said detection section specifies the posture information about said information processor from two kinds of postures that are different from each other by 90° about an optical axis of said imaging section.

7. The information processor according to claim 5, wherein said detection section specifies the posture information about said information processor from four kinds of postures different from each other by every 90° about an optical axis of said imaging section.

8. The information processor according to claim 1, wherein said determination information includes at least one of an operation signal generated by operating said information processor, at least one of said first image and said second image, and an output signal from a posture sensor provided to said information processor.

9. The information processor according to claim 1, wherein said first generating process and said second generating process use images where pixel values of said first source image and said second source image are shifted spatially in pixel unit at a time of generating said stereoscopic image.

10. The information processor according to claim 1, wherein said generating section generates said stereoscopic image so that a parallax state in an image group composing said stereoscopic image in said first generating process and said second generating process is different from a parallax state of said first image and said second image.

11. The information processor according to claim 1, wherein said information processor is a mobile information terminal, a digital still camera, or a digital video camera.

12. An information processing method, comprising:
   determining a geometrical relationship between an arrangement direction of a first imaging system and a second imaging system in imaging section having said first imaging system and said second imaging system for photographing a subject from different directions and a horizontal direction based on determination information for determining said geometrical relationship;
   executing one generating process selected from a first generating process and a second generating process that are different from each other according to a determination result of said geometrical relationship based on an imaged result from said imaging section so as to generate a stereoscopic image of said subject, wherein a first source image obtained from said imaged result is a target for said first generating process, a second source image obtained from said imaged result is a target for said second generating process; and
   selecting rules of said first source image and said second source image from said imaged result that are different from each other, wherein said selecting said rules are such that;
   when said arrangement direction is determined as being the horizontal direction, a first image obtained by said first imaging system and a second image obtained by said second imaging system are adopted as said first source image, and
   when said arrangement direction is determined as being other than the horizontal direction, one image of said first image and said second image is adopted as said second source image.

* * * * *